United States Patent
Chew et al.

(10) Patent No.: US 11,157,225 B2
(45) Date of Patent: Oct. 26, 2021

(54) INFORMATION-PROCESSING DEVICE REGISTERING PRINT QUEUE INFORMATION INCLUDING PRINT SETTING ON MEMORY

(71) Applicant: BROTHER KOGYO KABUSHIKI KAISHA, Nagoya (JP)

(72) Inventors: Po Chun Chew, Nagoya (JP); Koshi Fukazawa, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/023,134

(22) Filed: Sep. 16, 2020

(65) Prior Publication Data
US 2021/0096799 A1 Apr. 1, 2021

(30) Foreign Application Priority Data
Sep. 30, 2019 (JP) .............................. JP2019-179766

(51) Int. Cl.
*G06F 3/06* (2006.01)
*G06F 3/12* (2006.01)
*G06F 3/0481* (2013.01)

(52) U.S. Cl.
CPC .......... *G06F 3/1296* (2013.01); *G06F 3/0481* (2013.01); *G06F 3/1231* (2013.01); *G06F 3/1284* (2013.01)

(58) Field of Classification Search
CPC .... G06F 3/1296; G06F 3/1231; G06F 3/1236; G06F 3/1254; G06F 9/4413
USPC .......... 358/1.15, 1.9, 1.16; 399/13; 717/170; 710/2, 10, 19, 62, 64
See application file for complete search history.

(56) References Cited

U.S. PATENT DOCUMENTS

| 6,697,073 | B1 | 2/2004 | Kadota | |
| 2004/0210897 | A1* | 10/2004 | Brockway | H04L 67/16 717/174 |
| 2006/0221368 | A1* | 10/2006 | Higuchi | G06F 3/1204 358/1.13 |
| 2011/0075205 | A1* | 3/2011 | Oomura | G06F 3/126 358/1.15 |

FOREIGN PATENT DOCUMENTS

JP  2000-242454 A  9/2000

\* cited by examiner

*Primary Examiner* — Jamares Q Washington
(74) *Attorney, Agent, or Firm* — Kenealy Vaidya LLP

(57) ABSTRACT

A set of program instructions, when executed by a computer of an information-processing device, causes the computer to perform: detecting; and registering. The detecting detects, after first print queue information is registered, second print queue information being registered. The first print queue information includes a first print queue name, a first print setting, and a first port ID. The first print queue name is based on a printer name acquired via a plug-and-play process for a printer connected to a first port. The second print queue information includes a second print queue name, a second print setting, and a second port ID. The second print queue name is based on the printer name and different from the first print queue name. The registering registers, in response to the detecting, third print queue information including the printer name, the first print setting, and the second port ID.

17 Claims, 12 Drawing Sheets

INFORMATION-PROCESSING DEVICE REGISTERING PRINT QUEUE INFORMATION INCLUDING PRINT SETTING ON MEMORY

CROSS REFERENCE TO RELATED APPLICATION

This application claims priority from Japanese Patent Application No. 2019-179766 filed Sep. 30, 2019. The entire content of the priority application is incorporated herein by reference.

TECHNICAL FIELD

The present disclosure relates to a set of program instructions installed on an information-processing device in which an operating system generates print queue information.

BACKGROUND

There has been known a printing system including a plurality of printers that are connected to a computer. The printing system enables the user to select one of the printers to be used for printing from a list of port names. The computer registers the port name of each printer and the port name includes the model name and serial number of the printer. When the user selects the port name of a desired printer, the computer issues a print command to the printer having the serial number that is included in the selected port name.

SUMMARY

Plug-and-Play is a function that can be implemented by an operating system (hereinafter abbreviated as "OS") installed on some personal computers and other information-processing devices. The Plug-and-Play function is used to perform a process for discovering devices connected to physical ports, such as USB ports, and for setting up drivers corresponding to the connected devices so that the devices can be used. When a printer is connected to a physical port as a device, the OS generates print queue information and records this information in the registry. Print queue information associates a port ID identifying the physical port to which the printer is connected, a printer name that the OS has acquired from the printer, a printer driver associated with the printer name, and print settings that the printer driver references.

When executing a Plug-and-Play process, the OS sometimes generates new print queue information associated with a printer name for which print queue information was previously generated. Consequently, if the user selects the newly generated print queue information when instructing the information-processing device to perform a printing operation, the information-processing device issues a print command to the printer that may include different print settings from the print settings specified in the previously generated print queue information. There has not been disclosed a technique for controlling a printer to print using print settings in the previously recorded print queue information when new print queue information is generated.

In view of the foregoing, it is an object of the present disclosure to provide a technology for executing a printing operation on a printer using the print settings in previously recorded print queue information, even after the OS has generated new print queue information.

In order to attain the above and other objects, the present disclosure provides a non-transitory computer readable storage medium storing a set of program instructions installed on and executed by a computer. The computer is included in an information-processing device on which an operating system is installed. The operating system is configured to cause the computer to perform: executing a plug-and-play process for a printer connected to a physical port having a port ID to acquire a printer name from the printer, the physical port including at least a first port having a first port ID; generating a print queue name based on the acquired printer name; and registering print queue information on a memory. The print queue information includes the print queue name, a print setting, and the port ID mutually associated with one another. The information-processing device is configured to install an application program thereon. The application program is configured to cause the computer to perform: displaying a selection screen on a display, the selection screen including at least one print queue name registered on the memory; receiving a user selection for one of the at least one print queue name through the selection screen; and outputting to the operating system a print command specifying the print queue information corresponding to the selected print queue name. The operating system is configured to cause, in response to the print command, the computer to further perform outputting a print execution command to the printer connected to the physical port identified by the port ID included in the specified print queue information specified by the print command. The print execution command instructs the printer to execute a print operation using the print setting included in the specified print queue information. The set of program instructions, when executed by the computer, causes the computer to perform: (a) detecting; and (b) registering. The (a) detecting detects, after first print queue information is registered on the memory, second print queue information being registered on the memory. The first print queue information includes a first print queue name, a first print setting, and the first port ID mutually associated with one another. The first print queue name is based on a first printer name acquired via a first plug-and-play process for a first printer connected to the first port. The second print queue information includes a second print queue name, a second print setting, and a second port ID mutually associated with one another. The second print queue name is based on the first printer name and different from the first print queue name. The (b) registering registers, in response to detecting the second print queue information being registered on the memory, third print queue information on the memory. The third print queue information includes the first printer name, the first print setting, and the second port ID mutually associated with one another.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, a present embodiment of the present disclosure will be described. The embodiment described below is merely an example of the present disclosure, and it would be apparent to those skilled in the art that the embodiment of the present disclosure may be modified as appropriate without departing from the spirit thereof. For example, the order for executing steps in the processes described below may be modified as needed without departing from the spirit of the disclosure. Alternatively, some of the steps described below may be omitted as needed without departing from the spirit of the disclosure.

Figure 1:
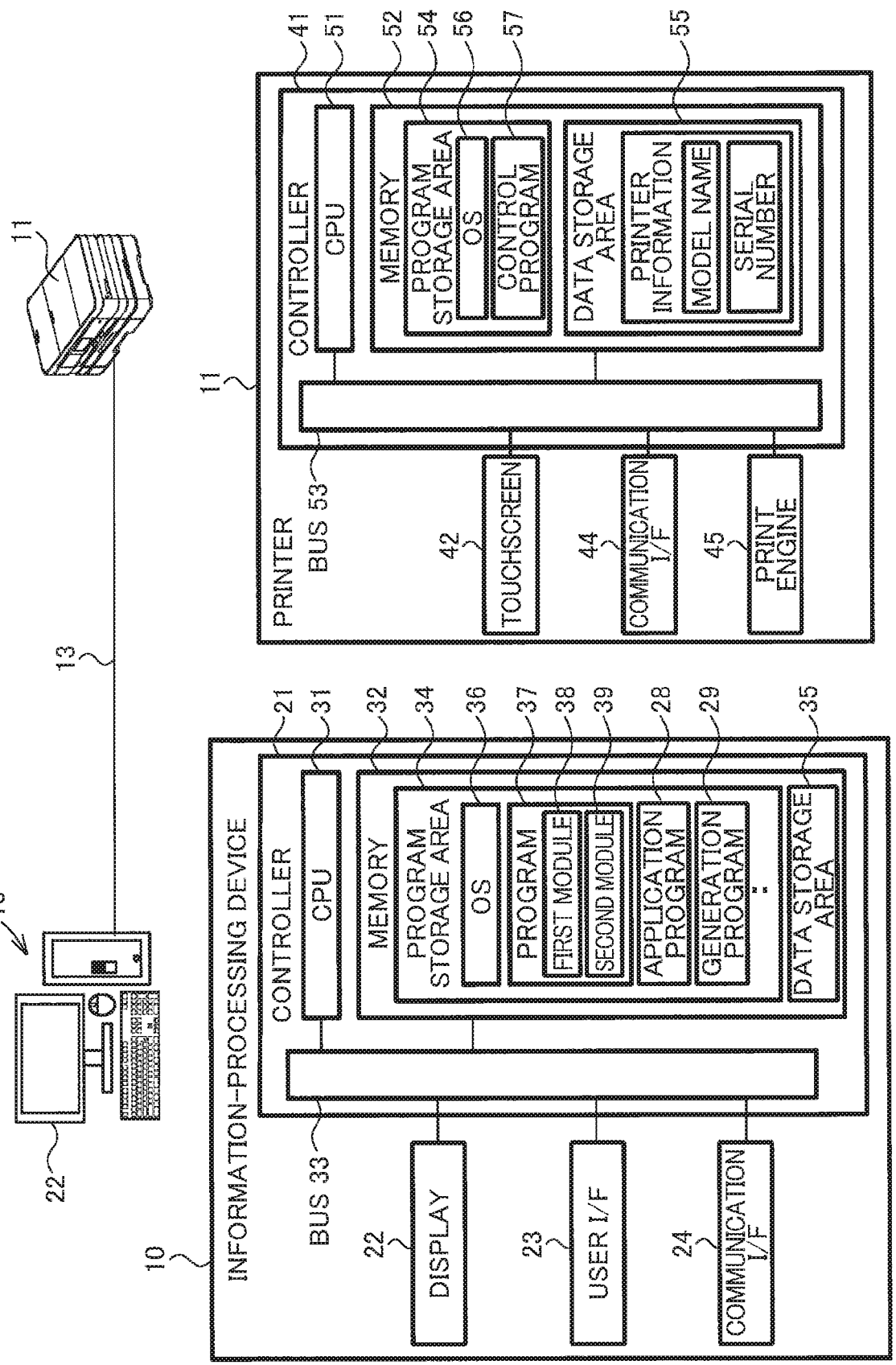
FIG. 1 is a functional block diagram illustrating an information-processing device according to an embodiment of the present disclosure and a printer.

The present embodiment will describe a program 37 that is installed on an information-processing device 10 illustrated in FIG. 1. The information-processing device 10 is a personal computer, for example. The information-processing device 10 is connected to a printer 11 by a USB cable 13 so as to be capable of communicating with the printer 11. When a command to execute a print is received from the user, the information-processing device 10 displays a selection screen on a display 22. The selection screen enables the user to select the printer 11. When the user selects the printer 11 in the selection screen, the information-processing device 10 issues a command to the printer 11 to execute a printing operation. The information-processing device 10 also displays a print queue name in the selection screen. The print queue name is the name of the print queue generated for the printer 11 connected to the information-processing device 10. The program 37 executes a re-registration process for generating a new print queue or deleting an old print queue in order to facilitate the user in making selections in the selection screen. This process will be described later in greater detail.

The printer 11 is provided with a controller 41, a touchscreen 42, a communication interface 44, and a print engine 45.

The touchscreen 42 has a display panel, and a clear touch-sensor film superposed over the display panel. The touch-sensor film outputs position information specifying positions on the display panel that have been touched by the user. Position information outputted from the touch-sensor film is inputted into the controller 41. Using the position information inputted from the touch-sensor film, the controller 41 can determine whether an icon or the like displayed on the display panel has been selected.

The communication interface 44 includes a communication interface conforming to the USB (Universal Serial Bus; registered trademark) communication standard. The printer 11 is connected to the information-processing device 10 by the USB cable 13 and communicates with the information-processing device 10 using a communication interface conforming to the USB standard. An example of the USB standard is USB 2.0. The communication interface 44 may also include a communication interface conforming to the wired or wireless LAN or Bluetooth (registered trademark) communication standards.

The print engine 45 possesses a function for printing images on sheets by ejecting ink droplets onto the sheets. Alternatively, the print engine 45 may have a function for printing images on sheets by transferring toner onto the sheets. Alternatively, the print engine 45 may have a function for forming images on cloth or the like through embroidery. Alternatively, the print engine 45 may have a function for forming images on objects with a laser beam. Alternatively, the print engine 45 may have a function for forming images using structural colors formed through organized microfibrillation (OM). Hence, the printer 11 may be any of various types of printers.

The controller 41 is provided with a central processing unit (hereinafter abbreviated as "CPU") 51, a memory 52, and a bus 53. The CPU 51 and memory 52, as well as the touchscreen 42, communication interface 44, and print engine 45 described above, are connected to the bus 53. Hence, the CPU 51 can store information and data in the memory 52 and can read information and data from the memory 52. The CPU 51 can also display screens on the display panel of the touchscreen 42 by inputting image data into the display panel, and can acquire information and data inputted into the touchscreen of the touchscreen 42. The CPU 51 can also transmit information and data to the information-processing device 10 through the communication interface 44 and can acquire information and data from the information-processing device 10 through the communication interface 44. The CPU 51 can also control the print engine 45 to execute a printing operation by inputting print data into the print engine 45. The CPU 51 executes a plurality of programs, including an OS 56 and a control program 57 described later, in a pseudo-parallel manner through multitasking.

The memory 52 is configured of a ROM, a RAM, a hard disk drive, a portable storage medium such as a USB memory, an EEPROM, or a buffer provided in the CPU 51. The memory 52 may be any storage medium that can be read by a computer. A computer-readable storage medium is a non-transitory medium. In addition to the above examples, non-transitory media include a CD-ROM and a DVD-ROM. A non-transitory medium is also a tangible medium. This description also applies to a memory 32 described later.

The memory 52 has a program storage area 54 that stores programs, and a data storage area 55 that stores data and the like required for executing the programs. The program storage area 54 stores an operating system (hereinafter abbreviated as "OS") 56 and a control program 57. The control program 57 directs the CPU 51 to implement a printing process for controlling the print engine 45 to print by inputting print data into the print engine 45.

The data storage area 55 stores printer information such as model names and serial numbers. The printer information including the model names and serial numbers is stored in the data storage area 55 when the printer 11 is manufactured, for example. The model name is an example of the printer name of the present disclosure. The serial number is an example of the printer identification information of the present disclosure.

The information-processing device 10 is provided with a controller 21, a display 22, a user interface 23, and a communication interface 24. The user interface 23 includes a mouse, a keyboard, a microphone, and the like.

The communication interface 24 has the same configuration as the communication interface 44 described above. That is, the communication interface 24 includes a communication interface conforming to the USB communication standard. Ports for connecting devices are configured in communication interfaces conforming to the USB standard. These ports represent a different concept from a print queue. In the present embodiment, ports configured in the communication interface 44 are treated as an example of the physical port of the present disclosure. A port ID identifies the physical port to which the printer 11 is connected. Port IDs may be generated by an OS 36 (described later). With a communication interface conforming to the USB standard, a physical port is set for each USB port in which a USB cable 13 is inserted. The information-processing device 10 may have a plurality of USB ports. In the examples of FIGS. 2 and 3, the information-processing device 10 has two USB ports that will be called USB01 and USB02. A port expansion device 12, such as a USB hub, may be connected to one of the USB ports of the information-processing device 10. In this case, the OS 36 (described later) of the information-processing device 10 possesses a function for identifying USB ports in the port expansion device 12 as USB ports of the information-processing device 10. The USB port is an example of the physical port of the present disclosure.

The controller 21 is provided with a CPU 31, a memory 32, and a bus 33. The CPU 31 and memory 32, as well as the user interface 23, communication interface 24, and display 22 described above, are connected to the bus 33. The configurations of the CPU 31, memory 32, and bus 33 are generally the same as the configurations of the CPU 51, memory 52, and bus 53 in the printer 11. The CPU 31 is an example of the computer of the present disclosure.

The memory 32 has a program storage area 34 that stores programs, and a data storage area 35 that stores data and the like required for executing the programs. The program storage area 34 stores an OS 36, a program 37, an application program 28, and one or a plurality of generation programs 29.

The OS 36 is Windows (registered trademark), MacOS (registered trademark), Unix (registered trademark), or Linux (registered trademark), for example.

The OS 36 has a Plug-and-Play function (hereinafter referred to as "PnP function"). The PnP function detects when a device is connected to and capable of communicating with the information-processing device 10, and sets up a driver on the information-processing device 10 that supports the type of the device. When the OS 36 detects that the printer 11 has been connected to a USB port as a device, the OS 36 sets up a generation program 29 for generating print data to be transmitted to the printer 11. Specifically, the OS 36 generates a print queue in the form of a folder and stores this print queue in the data storage area 35 of the memory 32. The storage area in the data storage area 35 in which the print queue is stored is known as the registry. Thus, the OS 36 records the print queue in the registry. The OS 36 also stores the model name of the printer 11, the port ID, and the print settings in the print queue recorded in the registry. This process will be described later in greater detail. In the following description, the process performed by the OS 36 using the PnP function will be called the PnP process. The print queue is an example of the print queue information of the present disclosure. Note that the print queue is not limited to be in the form of a folder.

The OS 36 also has a specific function that allows the user to select whether to generate a print queue for each printer 11 or to generate a print queue for each USB port. The specific function may be the IgnoreHWSerNum flag, for example. If the IgnoreHWSerNum function has been set up and the IgnoreHWSerNum flag has been set to "1", the OS 36 generates a print queue for each USB port. If the IgnoreHWSerNum function has not been set up or the IgnoreHWSerNum flag has been set to "0", the OS 36 generates a print queue for each printer 11. This process will be described later in greater detail.

The application program 28 may be a program that generates document files, a program that generates or edits drawings or other image data, a mail program that transmits and receives e-mail, and the like.

The generation program 29 generates print data based on image data received from the OS 36, the application program 28, or the like and outputs this print data to the printer 11. The print data generated by the generation program 29 is data that the printer 11 can interpret and use to execute a printing operation. If the OS 36 of the information-processing device 10 is Windows, for example, the generation program 29 is known as a printer driver. The generation program 29 may also be a supporting application program provided in the OS 36 or the application program 28 to support a printing function for executing printing operations on the printer 11. Some examples of this printing function are AirPrint (registered trademark), Mopria (registered trademark), and Google Cloud Print (registered trademark). The generation program 29 generates print data based on the print settings stored in the print queue. This process will be described later in greater detail.

The program 37 has a first module 38, and a second module 39. The first module 38 is known as a user interface (UI) module and executes a settings reception process to receive user input. The second module 39 executes a re-registration process described later to generate and delete print queues.

The program 37 also has specific model names that are specified through programming or configuration data. The program 37 executes a re-registration process (described later) on a print queue generated for a printer 11 having a model name matching one of the specific model names. The specific model names may be the model names of printers 11 provided by the vendor of the program 37. In other words, the program 37 executes a re-registration process on print queues generated for its own company's printers 11. This process will be described later in greater detail.

The data storage area 35 stores screen data, and one or more print queues. Screen data is data used to generate the screens illustrated in FIGS. 4A through 5B. The screen data is stored in the data storage area 35 in advance. Note that screen data may also be included in the program 37.

Next, processes executed by the program 37 will be described in detail. These processes include the settings reception process for receiving settings inputted by the user, and a process for detecting when a print queue has been recorded in the registry and for deleting a print queue and/or generating and recording a print queue in the registry.

The CPU 31 performs the processes described below according to instructions in the programs. In the following description, actions such as "determine," "extract," "select," "calculate," "decide," "identify," "acquire," "receive," "control," "set," and the like represent processes performed by the CPU 31. Processes performed by the CPU 31 include processes that control hardware through the OS 36. Note that the term "acquire" in this specification is used as a concept that does not necessarily require a request. In other words, a process by which the CPU 31 receives data without requesting that data is included in the concept of "the CPU 31 acquires data." The term "data" described herein is expressed as bit strings that can be read by a computer. Data of different formats are treated as the same data when the content of the data is essentially the same. The same holds true for "information" in this specification. An "instruction," a "response," a "request," or the like is processed by communicating information indicating the "instruction," the "response," or the "request." The terms "instruction," "response," and "request" may also be used to describe information indicating an "instruction," a "response," or a "request."

A process executed by the CPU 31 according to instructions described in a program may be described using abbreviated expressions, such as "the CPU 31 executes," "the controller 21 executes," and "the program 37 executes."

Further, a process performed by the CPU 31 to determine whether information A indicates circumstance B may be described conceptually as "determining whether circumstance B according to information A." A process in which the CPU 31 determines whether information A indicates circumstance B or circumstance C may be described conceptually as "determining whether circumstance B or circumstance C according to information A."

The terms "data" and "information" used in this specification share aspects of being bits or bit strings that computers can handle. The computer treats "data" without considering the significance of its individual bits. In the case of "information," on the other hand, the computer's operations branch according to the significance of the individual bits. Additionally, a "command" is a control signal prompting the destination device to perform the next operation. A command may include information and may itself possess the properties of information.

Further, "data" and "information" are treated as the same data and information even when the format (such as a text format, a binary format, or a flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between "data" and "information" is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, the phrases "according to" and "in response to" in this specification indicate that the process specified before each phrase is to be executed when the condition specified after the phrase has been met. Note that the timing at which the process is executed should be after the condition has been met, but need not be immediately after the condition is met.

First, a process in which the information-processing device 10 receives user input and transmits print data to the printer 11 will be briefly described. The application program 28 displays a Print icon on the display 22 for receiving a command from the user to execute a print. When the application program 28 receives the command to execute a print through the Print icon, the application program 28 displays a selection screen on the display 22 via the OS 36. The selection screen has icons with names of the print queues. The application program 28 receives a user selection for one of these icons.

According to the selected icon, the application program 28 outputs a print command to the OS 36 specifying that print data is to be transmitted to the corresponding printer 11. Upon receiving the print command, the OS 36 identifies the print queue having the same print queue name as the text in the selected icon, and displays a print settings screen on the display 22 that includes the print settings stored in the identified print queue. Print settings include information on the paper size, an option for printing in monochrome or color, and margin settings, for example.

The application program 28 transfers the print settings, and image data or a path specifying the location of the image data received via the OS 36 to the generation program 29 having the same name as the model name stored in the print queue, instructing the generation program 29 to generate print data. The application program 28 or OS 36 may also receive print settings inputted by the user and may transfer the print settings stored in the print queue to the generation program 29 after editing the print settings based on the settings received from the user. The generation program 29 generates print data according to the print settings stored in the print queue and the image data received from the application program 28 or OS 36, and transfers the generated print data or a path specifying the location of the print data to the OS 36. The OS 36 transmits a print execution command including the print data received from the generation program 29 to the printer 11 via the port specified by the port ID stored in the print queue. Note that the process executed by the application program 28, OS 36, and generation program 29 described above is just one example in which the information-processing device 10 transmits print data to the printer 11.

Next, the settings reception process executed by the program 37 to receive settings specified by the user will be described with reference to FIG. 6. The settings reception process is executed by the first module 38 of the program 37.

When started up, the program 37 determines in S11 whether the OS 36 has the specific function. If the program 37 determines that the OS 36 has the specific function (S11: YES), in S12 the program 37 displays a first settings screen on the display 22. Specifically, the program 37 inputs screen data representing the first settings screen into the display 22 to display the first settings screen on the display 22.

Figure 4A:
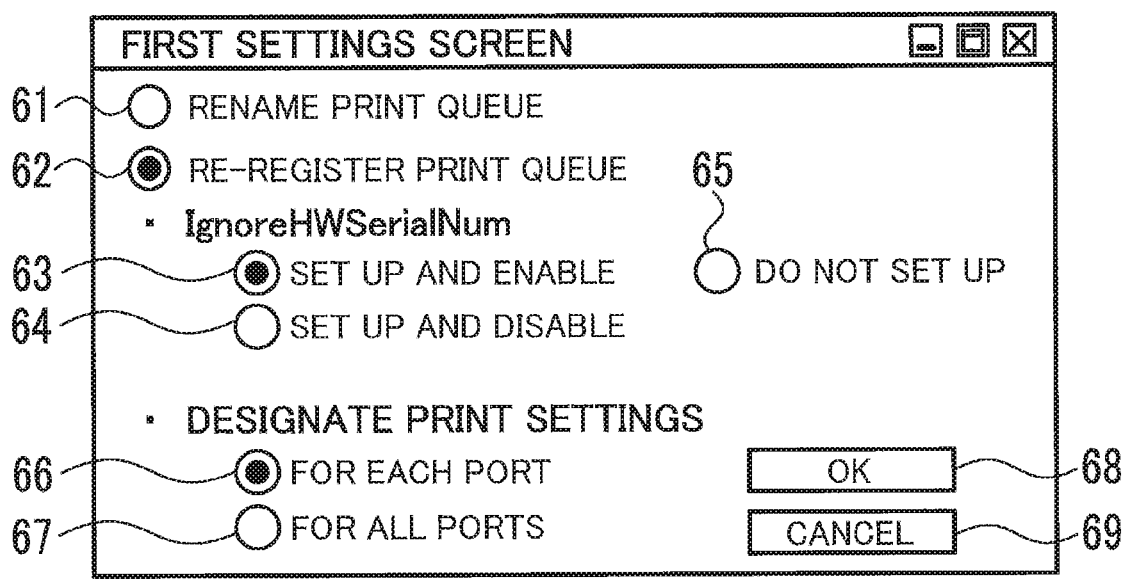
FIG. 4A is a schematic diagram illustrating a first settings screen displayed on a display of the information-processing device according to the embodiment.

As illustrated in FIG. 4A, the first settings screen has: radio buttons 61 and 62; the text "RENAME PRINT QUEUE" arranged to the right of the radio button 61; the text "RE-REGISTER PRINT QUEUE" arranged to the right of the radio button 62; an OK icon 68; and a Cancel icon 69. The radio button 61 is an object that receives a command to execute a renaming process for changing the name of the print queue to a different name. The radio button 62 is an object that receives a command to re-register the print queue. This specification will omit a description of the process performed when the radio button 61 is selected and focus on the process when the radio button 62 is selected.

The first settings screen also has: the text "IgnoreHWSerNum"; radio buttons 63, 64, and 65; the text "SET UP AND ENABLE" arranged to the right of the radio button 63; the text "SET UP AND DISABLE" arranged to the right of the radio button 64; and the text "DO NOT SET UP" arranged to the right of the radio button 65. The radio button 63 is an object that accepts a command to enable the specific function. The radio button 64 is an object that receives a command to disable the specific function. The radio button 65 is an object that receives a command not to set up the specific function.

The first settings screen also includes: the text "DESIGNATE PRINT SETTINGS"; radio buttons 66 and 67; the text "FOR EACH PORT" arranged to the right of the radio button 66; and the text "FOR ALL PORTS" arranged to the right of the radio button 67. The radio button 66 is an object that receives a command to allow different print settings to be stored in each print queue when a plurality of print queues is recorded in the registry. The radio button 67 is an object that receives a command to set print settings stored in each print queue to the same settings when a plurality of print queues is recorded in the registry.

The user selects any of the radio buttons 61 through 67, and then chooses either the OK icon 68 or the Cancel icon 69.

Figure 6:
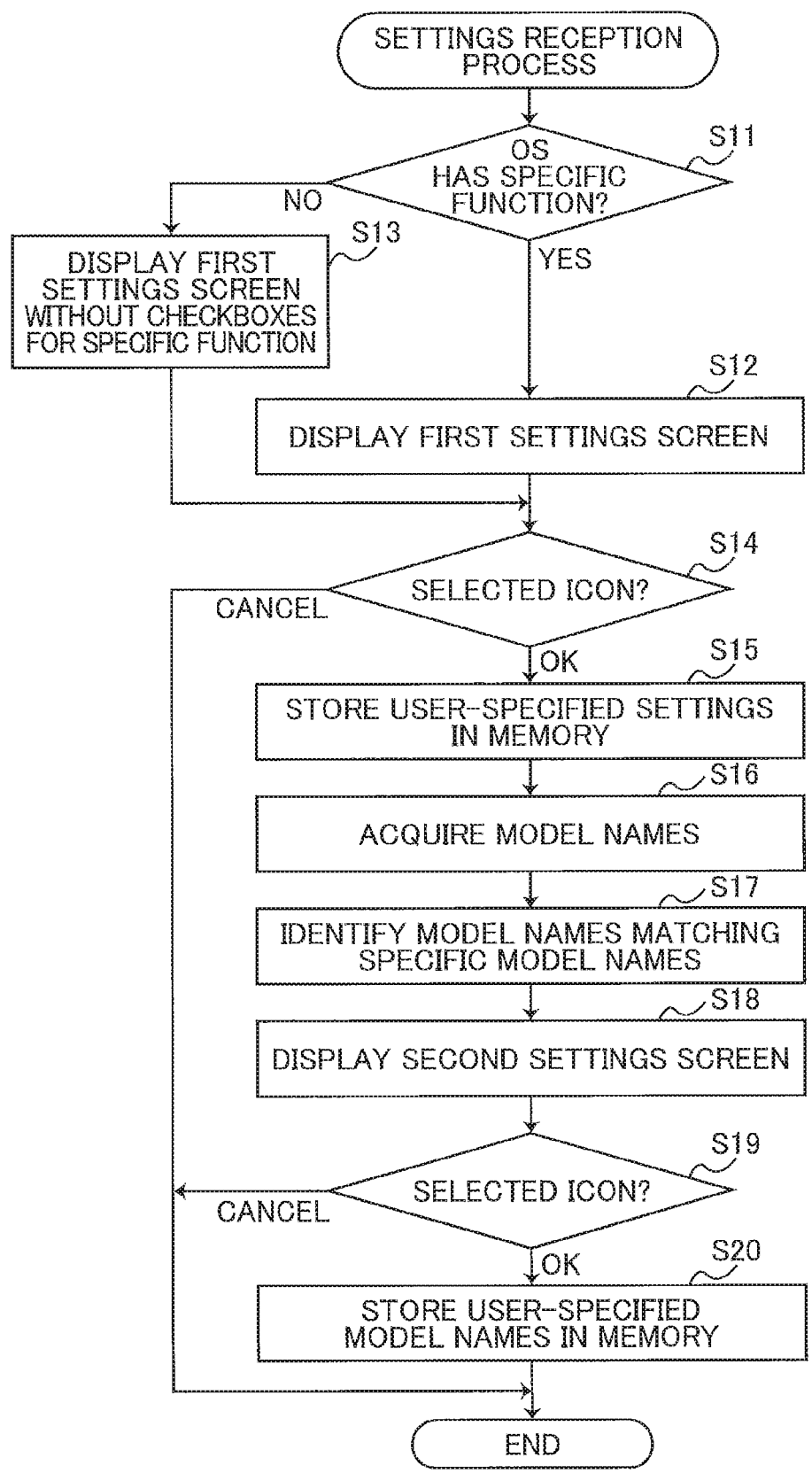
FIG. 6 is a flowchart illustrating steps in a settings reception process executed by a program installed on the information-processing device according to the embodiment.

On the other hand, if the program 37 determines in S1 of FIG. 6 that the OS 36 does not possess the specific function (S11: NO), in S13 the program 37 displays the first settings screen on the display 22 without the text "IgnoreHWSerNum" and the radio buttons 63, 64, and 65.

In S14 the program 37 determines whether the icon selected in the first settings screen is the OK icon 68 or the Cancel icon 69. When determining that the selected icon is the Cancel icon 69 (S4: CANCEL), the program 37 ends the settings reception process. However, if the program 37 determines that the selected icon is the OK icon 68 (S14: OK), in S15 the program 37 stores the user-specified settings indicated by the radio buttons 61 through 67 in the memory 32. The user-specified settings are an example of the user-specified setting of the present disclosure. The user-specified settings specifying "FOR EACH PORT" through the radio button 66 are an example of the first type for the user-specified setting of the present disclosure. The user-specified settings specifying "FOR ALL PORTS" through the radio button 67 are an example of the second type for the user-specified setting of the present disclosure. The process of S15 to store the user-specified settings in the memory 32 is an example of the (m) receiving of the present disclosure.

In S16 the program 37 reads and acquires the model name stored in each print queue recorded in the registry. In S17 the program 37 identifies the model names from among the names acquired in S16 that match the specific model names possessed by the program 37. That is, the program 37 identifies the model names corresponding to the program 37 from among all model names stored in print queues registered in the registry. In S18 the program 37 displays a second settings screen on the display 22. The second settings screen includes the identified model names. Specifically, the program 37 reads screen data from the memory 32, inputs the model names identified in S15 in entry fields or classes possessed by the screen data to generate screen data representing the second settings screen, and inputs this screen data into the display 22.

Figure 4B:
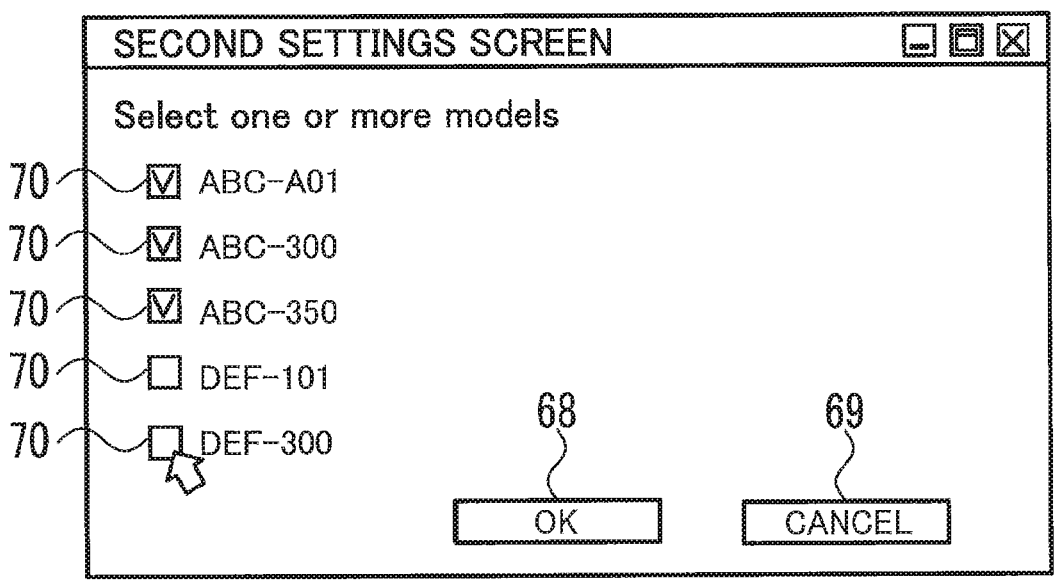
FIG. 4B is a schematic diagram illustrating a second settings screen displayed on the display of the information-processing device according to the embodiment.

As illustrated in FIG. 4B, the second settings screen has the text "Select one or more models," a plurality of checkboxes 70, model names arranged to the right of the corresponding checkboxes 70, the OK icon 68, and the Cancel icon 69. The user checks checkboxes 70 arranged to the left of the desired model names and selects the OK icon 68 or the Cancel icon 69.

In S19 of FIG. 6, the program 37 determines whether the icon selected in the second settings screen is the OK icon 68 or the Cancel icon 69. When the program 37 determines that the selected icon is the Cancel icon 69 (S19: CANCEL), the program 37 ends the settings reception process. However, if the program 37 determines that the selected icon is the OK icon 68 (S19: OK), in S20 the program 37 stores all model names next to checked checkboxes 70 in the data storage area 35 of the memory 32 as user-specified model names, and subsequently ends the settings reception process.

Next, a process executed by the program 37 when the OS 36 records a print queue in the registry will be described with reference to FIG. 7A.

The OS 36 executes the process from S21 to S23 using the PnP function. Specifically, in S21 the OS 36 detects that a printer 11 has been connected to a USB port. In S22 the OS 36 acquires the model name or the model name and serial number stored in the memory 52 of the printer 11 through the USB port. For example, the OS 36 transmits a command through the USB port to which the printer 11 is connected requesting the printer 11 to return the model name and serial number. Upon receiving the command, the control program 57 of the printer 11 reads the model name and serial number from the memory 52 and returns the model name and serial number to the information-processing device 10. The OS 36 of the information-processing device 10 receives this model name and serial number from the printer 11.

In S23 the OS 36 generates a print queue name based on the model name received in S22 and records a print queue with this print queue name in the registry. The process of S23 is an example of the registration of the first print queue information on the memory of the present disclosure. The OS 36 stores the model name or the model name and serial number acquired from the printer 11 in the print queue recorded in the registry. The OS 36 also generates a port ID distinguishing the USB port to which the printer 11 is connected from other ports and stores this port ID in the print queue. The OS 36 also identifies the generation program 29 possessing the same name as the model name acquired from the printer 11 from the plurality of generation programs 29 stored in the memory 32, and acquires default print settings from the identified generation program 29. Hence, the print queue correlates the model name and serial number of the printer 11 with the port ID specifying the port to which the printer 11 is connected, the print settings for the printer 11, and the identified generation program 29.

Next, print queues that the OS 36 records in the registry will be described in greater detail with reference to FIGS. 2A through 2D.

Figure 2A:
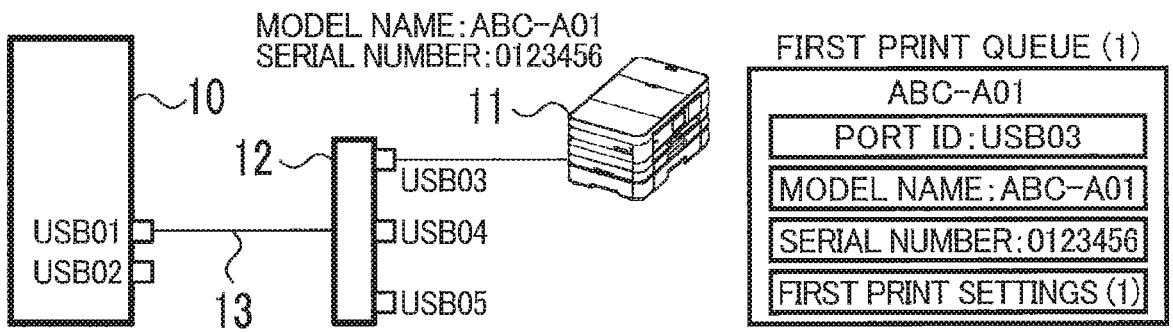
FIG. 2A is an explanation diagram illustrating a relation between a connection condition of the printer to the information-processing device and a print queue recorded in a memory of the information-processing device, where a print queue having a print queue name containing a model name of the printer is not recorded in the memory and a setting for a specific function is disabled.

Next, a first print queue (1) will be described with reference to FIG. 2A. The OS 36 records the first print queue (1) in the registry under the conditions illustrated in FIG. 2A. FIG. 2A illustrates a state in which a printer 11 having the model name "ABC-A01" is connected to a USB port while a print queue having a print queue name including the model name "ABC-A01" is not recorded in the registry, and the specific function has not been set up or the setting for the specific function is disabled. In this state, the OS 36 communicates with the printer 11 via the USB port and the USB cable 13 to acquire the serial number and model name from the printer 11. The OS 36 records the first print queue (1) in the registry with a print queue name set to the acquired model name "ABC-A01".

The OS 36 also generates the port ID "USB03" identifying the USB port to which the printer 11 is connected. The OS 36 also acquires default print settings from the generation program 29 having the same name as the acquired model name. The OS 36 stores the generated port ID, the model name and serial number acquired from the printer 11, and the print settings acquired from the generation program 29 in the print queue. Note that the print settings stored in the first print queue (1) are overwritten with print settings that the user set when issuing a command to execute a print to the information-processing device 10. Hereinafter, print settings in the first print queue (1) following such overwriting will be called the first print settings (1).

Next, a second print queue (1) will be described with reference to FIG. 2B. The OS 36 records the second print queue (1) in the registry under the conditions illustrated in FIG. 2B. That is, beginning from the state illustrated in FIG. 2A, the printer 11 connected to the USB port having the port ID "USB03" is disconnected therefrom and reconnected to another USB port having the port ID "USB05" while the specific function remains unset or the setting for the specific function remains disabled. In this state, the OS 36 communicates with the printer 11 via the USB port and the USB cable 13 to acquire a serial number and a model name from the printer 11. Since the first print queue (1) having the same print queue name as the acquired model name is currently stored in the registry, the OS 36 records the second print queue (1) having the name "ABC-A01 (copy)" in the registry. Here, the text "copy" is appended to the acquired model name "ABC-A01".

The OS 36 also generates the port ID "USB05" identifying the USB port to which the printer 11 is connected. The OS 36 also acquires default print settings from the generation program 29 having the same name as the acquired model name. The OS 36 stores the generated port ID, the model name and serial number acquired from the printer 11, and the default print settings acquired from the generation program 29 in the second print queue (1). In the following description, print settings stored in the second print queue (1) will be called the second print settings (1). The second print settings (1) may be the same as or different from the first print settings (1). The following description will assume that the first print settings (1) and the second print settings (1) differ from each other.

Figure 2B:
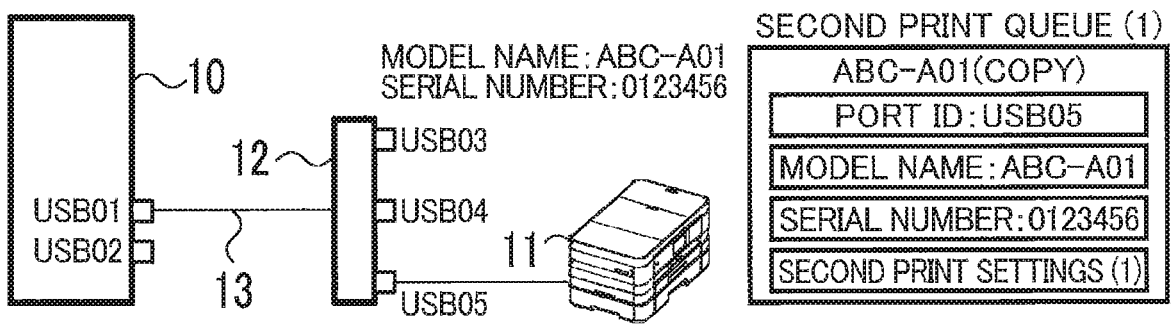
FIG. 2B is an explanation diagram illustrating a relation between a connection condition of the printer to the information-processing device and a print queue recorded in the memory of the information-processing device, where the printer connected to one port under the condition illustrated in FIG. 2A is disconnected therefrom and reconnected to another port while the setting for the specific function remains disabled.

Under the conditions illustrated in FIG. 2B, the first print queue (1) having the print queue name "ABC-A01" and the second print queue (1) having the print queue name "ABC-A01 (copy)" are both recorded in the registry.

Next, a second print queue (2) will be described with reference to FIG. 2C. The OS 36 records the second print queue (2) in the registry under the conditions illustrated in FIG. 2C. That is, beginning from the state illustrated in FIG. 2A, the printer 11 connected to the USB port having the port ID "USB03" is replaced with another printer 11 while the specific function remains unset or the setting for the specific function remains disabled. In this state, the OS 36 communicates with the other printer 11 through the USB port and the USB cable 13 to acquire a serial number and a model name from the other printer 11. Since the first print queue (1) having the same print queue name as the acquired model name is currently recorded in the registry, the OS 36 records a second print queue (2) having the print queue name "ABC-A01 (copy)" in the registry by adding the text "copy" to the acquired model name "ABC-A01".

The OS 36 also acquires default print settings from the generation program 29 having the same name as the acquired model name. The OS 36 stores the generated port ID, the model name and serial number acquired from the printer 11, and the default print settings acquired from the generation program 29 in the second print queue (2). In the following description, print settings stored in the second print queue (2) will be called the second print settings (2). The following description will also assume that the first print settings (1) differ from the second print settings (2).

Figure 2C:
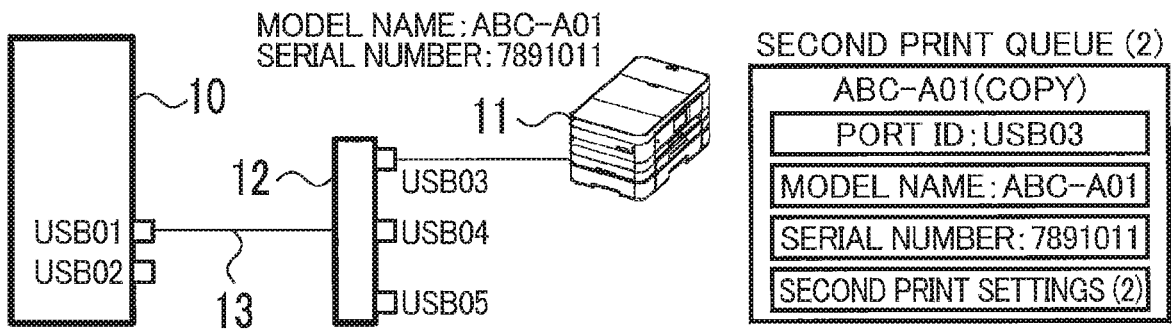
FIG. 2C is an explanation diagram illustrating a relation between a connection condition of the printer to the information-processing device and a print queue recorded in the memory of the information-processing device, where the printer connected to one port under the condition illustrated in FIG. 2A is disconnected therefrom and another printer is connected to the same port while the setting for the specific function remains disabled.

In the state illustrated in FIG. 2C, the first print queue (1) having the print queue name "ABC-A01" and the second print queue (2) having the print queue name "ABC-A01 (copy)" are both recorded in the registry.

Figure 2D:
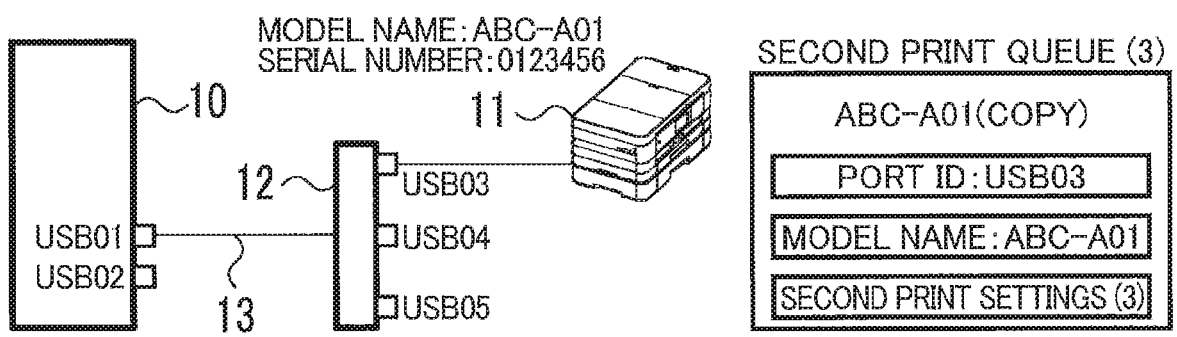
FIG. 2D is an explanation diagram illustrating a relation between a connection condition of the printer to the information-processing device and a print queue recorded in the memory of the information-processing device, where the printer connected to one port under the condition illustrated in FIG. 2A is disconnected therefrom, and subsequently the setting for the specific function is enabled and the disconnected printer is reconnected to the same port.

Next, a second print queue (3) will be described with reference to FIG. 2D. The OS 36 records the second print queue (3) in the registry under the conditions illustrated in FIG. 2D. That is, beginning from the state illustrated in FIG. 2A, the setting for the specific function is enabled and the printer 11 connected to the USB port having the port ID "USB03" is removed from that USB port and subsequently reconnected to the same USB port having the port ID "USB03". Alternatively, FIG. 2D illustrates the state in which, beginning from the state illustrated in FIG. 2A, the printer 11 connected to the USB port having the port ID "USB03" is removed from that USB port, and subsequently the setting for the specific function is enabled and the removed printer 11 is reconnected to the same USB port having the port ID "USB03".

In this state, the OS 36 communicates with the printer 11 via the USB port and the USB cable 13 to acquire the model name from the printer 11. Since the first print queue (1) having the same print queue name as the acquired model name is currently recorded in the registry, the OS 36 records the second print queue (3) in the registry with the print queue name "ABC-A01 (copy)" formed by appending the text "copy" to the acquired model name "ABC-A01".

The OS 36 also generates the port ID "USB3". The OS 36 stores the generated port ID and the model name acquired from the printer 11 in the second print queue (3). That is, since the setting for the specific function has been enabled, the OS 36 need not identify the printer 11 connected to the USB port and, hence, does not store the serial number of the printer 11 in the second print queue (3). In other words, the OS 36 generates a print queue for the port ID rather than for the printer 11. Hence, when the setting for the specific function is enabled, a new print queue is not generated when the printer 11 (first printer 11) connected to a USB port is replaced with a different printer 11 of the same model (second printer 11). Thus, when the user selects the icon in the selection screen specifying the print queue generated for the first printer 11, print data is transmitted to the second printer 11. Note that the OS 36 may store a serial number in the print queue as part of the information specified by the print queue.

The OS 36 also acquires default print settings from the generation program 29 having the same name as the acquired model name and stores the acquired print settings in the second print queue (3). Hereinafter, print settings stored in the second print queue (3) will be called the second print settings (3). The following description will assume that the first print settings (1) differ from the second print settings (3).

In the state illustrated in FIG. 2D, the first print queue (1) having the print queue name "ABC-A01" and the second print queue (3) having the print queue name "ABC-A01 (copy)" are both recorded in the registry.

Figure 3A:
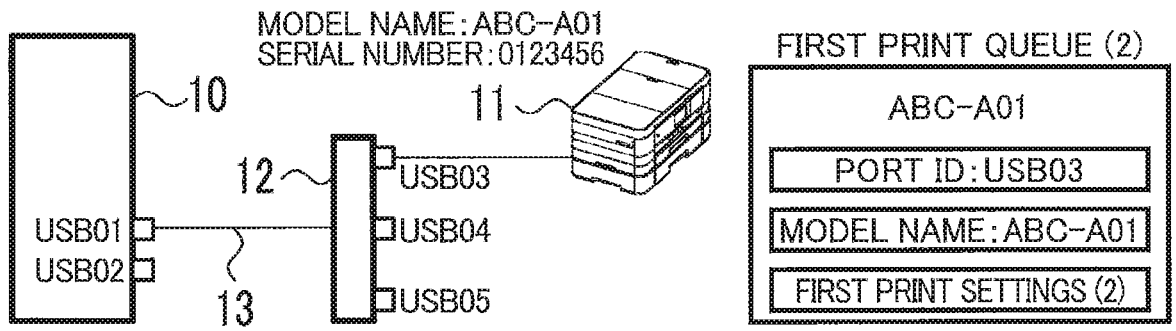
FIG. 3A is an explanation diagram illustrating a relation between a connection condition of the printer to the information-processing device and a print queue recorded in the memory of the information-processing device, where a print queue having a print queue name containing the model name of the printer is not recorded in the memory and the setting for the specific function is enabled.

Next, a first print queue (2) will be described with reference to FIG. 3A. The OS 36 records the first print queue (2) in the registry under the conditions illustrated in FIG. 3A. FIG. 3A illustrates a state in which a printer 11 having the model name "ABC-A01" is connected to a USB port while a print queue having a print queue name that includes "ABC-A01" is not recorded in the registry and the setting for the specific function is enabled. In this state, the OS 36 communicates with the printer 11 via the USB port and the USB cable 13 to acquire a model name from the printer 11. The OS 36 records the first print queue (2) in the registry with the acquired model name "ABC-A01" as the print queue name.

The OS 36 also generates the port ID "USB3" and acquires default print settings from the generation program 29 having the same name as the acquired model name. The OS 36 stores the generated port ID, the model name acquired from the printer 11, and the default print settings acquired from the generation program 29 in the first print queue (2). Note that print settings stored in the first print queue (2) are overwritten by print settings set by the user when issuing a command to execute a print to the information-processing device 10. In the following description, the print settings in the first print queue (2) after being overwritten will be called the first print settings (2).

Figure 3B:
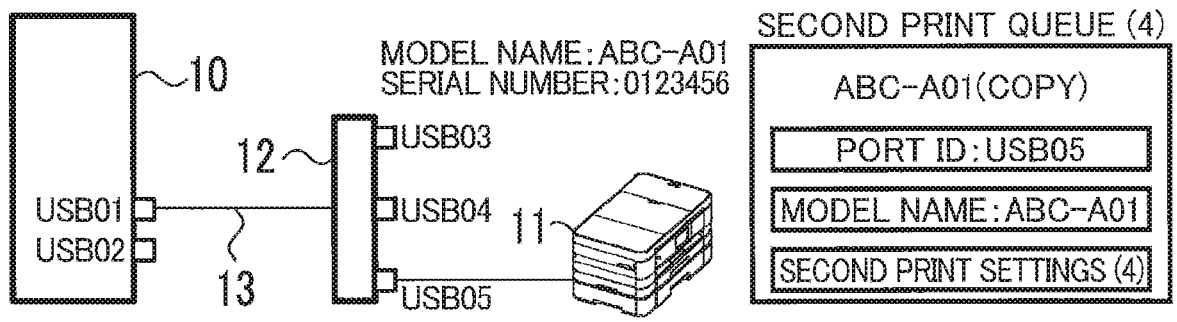
FIG. 3B is an explanation diagram illustrating a relation between a connection condition of the printer to the information-processing device and a print queue recorded in the memory of the information-processing device, where the printer connected to one port under the condition illustrated in FIG. 3A is disconnected therefrom and reconnected to another port while the setting for the specific function remains enabled.

Next, a second print queue (4) will be described with reference to FIG. 3B. The OS 36 records the second print queue (4) under the conditions illustrated in FIG. 3B. FIG. 3B illustrates a state in which the printer 11 that is connected to the USB port having the port ID "USB03" in the state illustrated in FIG. 3A is disconnected therefrom and connected to another USB port having the port ID "USB05" while the setting for the specific function remains enabled. In this state, the OS 36 communicates with the printer 11 via the USB port and the USB cable 13 to acquire a model name from the printer 11. Since the first print queue (2) having the same print queue name as the acquired model name has already been recorded in the registry, the OS 36 records the second print queue (4) in the registry with the print queue name "ABC-A01 (copy)" formed by appending the text "copy" to the acquired model name "ABC-A01".

The OS 36 also generates the port ID "USB05" and acquires default print settings from the generation program 29 having the same name as the acquired model name. The OS 36 stores the generated port ID, the model name acquired from the printer 11, and the default print settings acquired from the generation program 29 in the second print queue (4). Hereinafter, the print settings stored in the second print queue (4) will be called the second print settings (4). The second print settings (4) may be the same as or different from the first print settings (2). The following description will assume that the second print settings (4) differ from the first print settings (2).

In the state illustrated in FIG. 3B, the first print queue (2) having the print queue name "ABC-A01" and the second print queue (4) having the print queue name "ABC-A01 (copy)" are both recorded in the registry. Hence, two print queues storing different print settings are recorded in the registry.

Figure 3C:
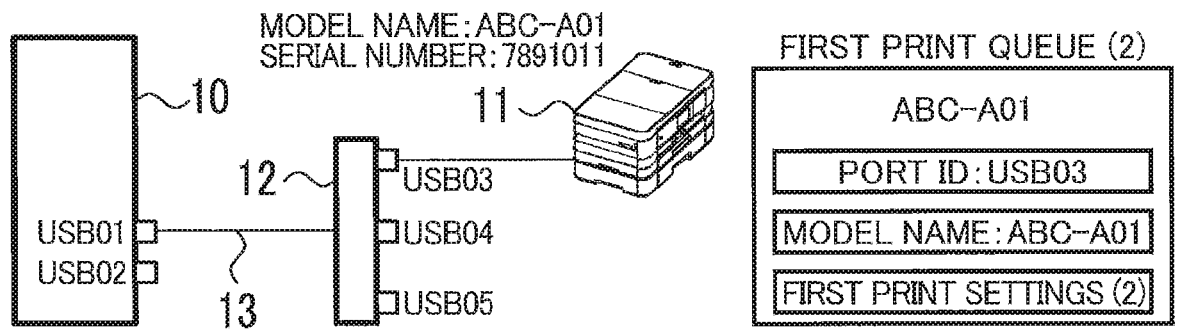
FIG. 3C is an explanation diagram illustrating a relation between a connection condition of the printer to the information-processing device and a print queue recorded in the memory of the information-processing device, where the printer connected to one port under the condition illustrated in FIG. 3A is disconnected therefrom and another printer having the same model name as the disconnected printer is reconnected to the same port while the setting for the specific function remains enabled.

Next, the print queues recorded in the registry will be described for the conditions illustrated in FIG. 3C. That is, beginning from the state illustrated in FIG. 3A, the printer 11 connected to the USB port having the port ID "USB03" is replaced with another printer 11 (i.e., the first printer 11 is disconnected and the second printer 11 is connected to the same port) while the setting for the specific function is kept enabled. In this state, the OS 36 communicates with the other printer 11 (second printer 11) through the USB port and the USB cable 13 to acquire a model name from the other printer 11 (second printer 11). Since the model name acquired from the other printer 11 (second printer 11) is identical to the print queue name stored in the first print queue (2), the OS 36 ends the process without generating a new print queue. Hence, in the state illustrated in FIG. 2C, only the first print queue (2) having the print queue name "ABC-A01" is recorded in the registry.

Each of the first print queue (1) and first print queue (2) is an example of the first print queue information of the present disclosure. The printer 11 specified by the serial number stored in each of the first print queue (1) and first print queue (2) is an example of the first printer of the present disclosure. The serial number stored in each of the first print queue (1) and first print queue (2) is an example of the first printer identification information of the present disclosure. The model name stored in each of the first print queue (1) and first print queue (2) is an example of the first printer name of the present disclosure. The port ID stored in each of the first print queue (1) and first print queue (2) is an example of the first port ID of the present disclosure. The USB port specified by the port ID stored in each of the first print queue (1) and first print queue (2) is an example of the first port of the present disclosure. The print queue name for each of the first print queue (1) and first print queue (2) is an example of the first print queue name of the present disclosure. The first print settings (1) and first print settings (2) respectively stored in the first print queue (1) and first print queue (2) are an example of the first print setting of the present disclosure.

Each of the second print queue (1), second print queue (2), second print queue (3), and second print queue (4) is an example of the second print queue information of the present disclosure. The printer 11 specified by the serial number stored in each of the second print queue (1), second print queue (2), second print queue (3), and second print queue (4) is an example of the second printer of the present disclosure. The serial number stored in each of the second print queue (1), second print queue (2), second print queue (3), and second print queue (4) is an example of the second printer identification information of the present disclosure. The model name stored in each of the second print queue (1), second print queue (2), second print queue (3), and second print queue (4) is an example of the second printer name of the present disclosure. The port ID stored in each of the second print queue (1), second print queue (2), second print queue (3), and second print queue (4) is an example of the second port ID of the present disclosure. The USB port specified by the port ID stored in each of the second print queue (1), second print queue (2), second print queue (3), and second print queue (4) is an example of the second port of the present disclosure. The print queue name for each of the second print queue (1), second print queue (2), second print queue (3), and second print queue (4) is an example of the second print queue name of the present disclosure. The second print settings (1), second print settings (2), second print settings (3), and second print settings (4) respectively stored in the second print queue (1), second print queue (2), second print queue (3), and second print queue (4) are an example of the second print setting of the present disclosure.

Figure 7A:
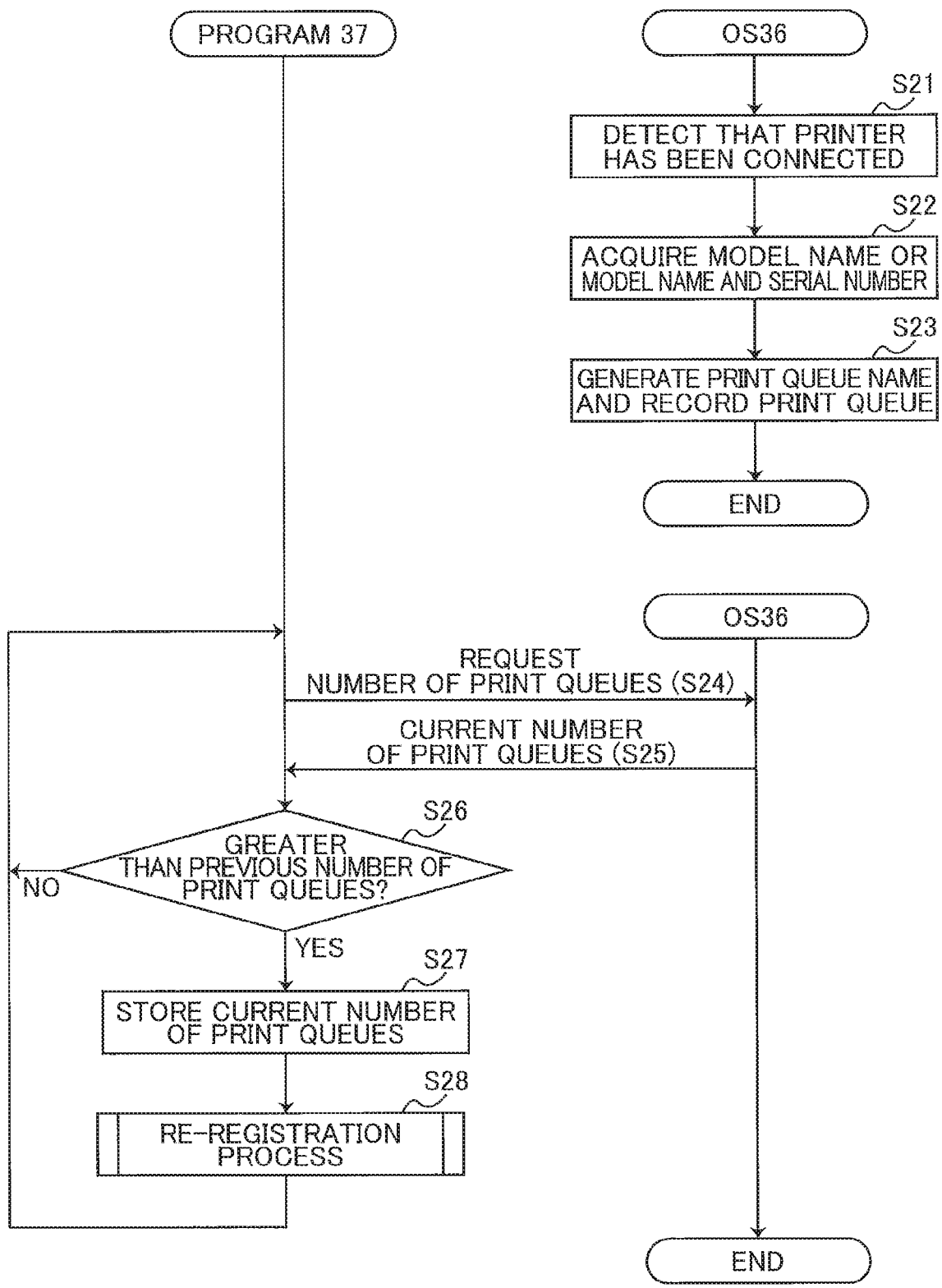
FIG. 7A includes a flowchart illustrating steps in a process executed by an operating system installed on the information-processing device using a Plug-and-Play function and a flowchart illustrating steps in a process executed by the program and the operating system when the operating system records a print queue in the memory using the Plug-and-Play function.

As illustrated in FIG. 7A, in S24 the program 37 periodically issues a request to the OS 36 for the number of print queues recorded in the registry. For example, the program 37 inputs a command into the OS 36 requesting the number of print queues each time a preset interval elapses. In S25 the program 37 acquires the number of print queues recorded in the registry from the OS 36.

In S26 the program 37 determines whether the number of print queues acquired in S25 (hereinafter called the "current number of print queues") is greater than the number of print queues that the OS 36 previously acquired and stored in the memory 32 in step S27 described later (hereinafter called the "previous number of print queues"). Hence, the program 37 determines in S26 whether a print queue had been newly recorded in the registry during the interval between the time the previous number of print queues was acquired from the OS 36 and the time the current number of print queues was acquired from the OS 36. The process of S26 is an example of the (a) detecting of the present disclosure.

If the program 37 determines in S26 that the current number of print queues acquired in S25 is less than or equal to the previous number of print queues stored in the memory 32 (S26: NO), the program 37 takes no further action until it is time to issue another request in S24. However, if the program 37 determines that the current number of print queues acquired in S25 is greater than the previous number of print queues (S26: YES), in S27 the program 37 stores the number acquired in S25 in the data storage area 35 of the memory 32. In S28 the program 37 executes the re-registration process. The re-registration process of S28 is executed by the second module 39 of the program 37.

Note that in S26 the program 37 may simply determine whether the current number of print queues acquired in S25 differs from the previous number of print queues. Alternatively, in S25 the program 37 may acquire the print queue names rather than the number of print queues. In this case, the program 37 determines in S26 whether the previous print queue names stored in the memory 32 match the current print queue names acquired in S25. The previous print queue names are those names previously acquired from the OS 36 and stored in the memory 32 in S27. If the currently acquired print queue names do not match the print queue names stored in the memory 32, in S27 the program 37 stores the acquired print queue names in the memory 32 and in S28 executes the re-registration process. Thus, as with the process of the present embodiment described above, this process also enables the program 37 to determine whether a new print queue has been recorded in the registry and to execute the re-registration process in such a case. However, using the number of print queues to determine whether a new print queue has been recorded in the registry can reduce the processing load on the CPU 31 and can shorten the time required to perform the process in steps S25, S26, and S27.

Next, the re-registration process will be described in detail with reference to FIG. 7B. In S30 at the beginning of this process, the program 37 determines whether the user-specified settings stored in the memory 32 in S15 of the settings reception process (see FIG. 6) indicate a selection to re-register a print queue. In other words, the program 37 determines whether the radio button 62 was selected in the first settings screen (see FIG. 4A). If the program 37 determines that the radio button 62 was not selected (S30: NO), the program 37 ends the re-registration process. Although not illustrated in the flowchart, if the program 37 determines that the radio button 61 was selected and not the radio button 62, the program 37 executes a process to change the name of a print queue.

If the program 37 determines that the user-specified settings indicate a selection to re-register a print queue (S30: YES), in S31 the program 37 reads the print queue names, port IDs, and model names stored in all print queues recorded in the registry. Hereinafter, information stored in the print queue, including the model name, print queue name, and port ID, will be collectively referred to as "queue information."

In S32 the program 37 reads the user-specified model names from the memory 32. The user-specified model names were stored in the memory 32 in S16 of the settings reception process (see FIG. 6). In S33 the program 37 identifies print queues having the user-specified model names acquired in S32. More specifically, in S33 the program 37 identifies print queues among the print queues recorded in the registry whose model name matches one of the user-specified model names acquired in S32. Although not illustrated in the flowchart, the program 37 ends the re-registration process when there exist no print queues storing a model name that matches any of the user-specified model names.

In S34 the program 37 identifies print queue names in the print queues identified in S33 that include the text "copy." More specifically, in S34 the program 37 identifies print queues among the print queues identified in S33 whose print queue name includes the text "copy." Using the examples of FIGS. 2A through 3C, the program 37 will identify the second print queues (1) through (4). While not illustrated in the flowchart, the program 37 ends the re-registration process if there exist no print queue names that contain the text "copy." The text "copy" is an example of the specific name of the present disclosure.

In S35 the program 37 identifies print queues among the print queues identified in S34 whose port type specified by the stored port ID is USB. While not illustrated in the flowchart, the program 37 ends the re-registration process when there exist no print queues having a port ID indicating a USB port type.

In S36 the program 37 determines whether the user-specified settings received in the settings reception process include a selection to set up and enable the specific function. That is, the program 37 determines whether the radio button 63 in the first settings screen (see FIG. 4A) has been selected or whether one of the radio buttons 64 and 65 has been selected. If the program 37 determines that the user-specified settings include the selection to set up and enable the specific function (S36: YES), in S37 the program 37 determines whether the setting for the specific function is currently enabled or disabled. That is, in S37 the program 37 determines whether, after the user selected the option in the first settings screen to "SET UP AND ENABLE" the specific function, the OS 36 was instructed to disable the setting for the specific function. If the program 37 determines that the setting for the specific function is currently enabled (S37: ENABLED), in S38 the program 37 executes a process for an enabled function. Hence, the process for an enabled function is executed for cases such as when the second print queue (3) illustrated in FIG. 2D or the second print queue (4) illustrated in FIG. 3B is recorded in the registry.

Here, the process for an enabled function will be described in detail with reference to FIGS. 8A and 8B. In S81 at the beginning of the process for an enabled function, the program 37 determines whether any of the print queues recorded in the registry stores a port ID specifying a USB port through which communication with the printer 11 connected thereto is impossible. Hereinafter, a print queue storing a port ID specifying a USB port through which communication with the printer 11 connected thereto is impossible will be called an offline print queue, while a print queue storing a port ID specifying a USB port through which communication with the printer 11 connected thereto is possible will be called an online print queue. In addition, a printer 11 with which communication through a USB port specified by the port ID stored in the online print queue is possible will be called an online printer 11, while a printer 11 with which communication through a USB port specified by the port ID stored in the offline print queue is impossible will be called an offline printer 11.

Thus, in S81 the program 37 determines whether the print queues recorded in the registry include offline print queues.

For example, the program 37 inputs a ping command into the OS 36 with the port ID stored in a print queue, and acquires an acknowledgment (ACK) or negative-acknowledgment (NACK) from the printer 11 via the OS 36. If the program 37 acquires an ACK from all printers 11, the program 37 determines that no offline print queues exist (S81: NO). If the program 37 acquires a NACK from a printer 11 via the OS 36, the program 37 determines that an offline print queue exists (S81: YES).

In the example illustrated in FIG. 3B, both the first print queue (2) illustrated in FIG. 3B and the second print queue (4) illustrated in FIG. 3B are recorded in the registry. In this state, the port ID stored in the first print queue (2) is USB03, but a printer 11 is the port ID stored in the first print queue (2) is USB03, but a printer 11 is not connected to the USB port having the port ID "USB03". Accordingly, when executing the process for an enabled function while the second print queue (4) illustrated in FIG. 3B is recorded in the registry, the program 37 determines that an offline print queue exists (S81: YES).

If the program 37 determines that an offline print queue does not exist (S81: NO), in S82 the program 37 communicates with the printer 11 through the USB port having the port ID stored in each print queue to acquire a serial number from the printer 11. Note that the program 37 may acquire the serial number from each printer 11 through the OS 36 or may acquire the serial number through direct communication with each printer 11.

In S83 the program 37 determines whether the user-specified settings stored in the memory 32 in S15 of the settings reception process (see FIG. 6) indicate a selection for "FOR EACH PORT" or for "FOR ALL PORTS." The process of S83 is performed to confirm whether the user selected the option to set print settings the same for all print queues or to set print settings individually for each print queue among print queues having a print queue name that does not include the text "copy" and print queues having a print queue name that includes the text "copy," for example. In the following description, a print queue having a print queue name that does not contain the text "copy" will be called an original print queue, while a print queue having a print queue name that contains the text "copy" will be called a copy print queue.

If the program 37 determines that the user-specified settings indicate "FOR ALL PORTS" (S83: FOR ALL PORTS), in S84 the program 37 acquires the print settings stored in the original print queue and overwrites the print settings stored in the copy print queue (one or more copy print queues, if any,) with the print settings acquired from the original print queue. Hence, the print settings are made consistent for all print queues.

If the program 37 determines that the user-specified settings indicate "FOR EACH PORT" (S83: FOR EACH PORT), the program 37 identifies backup information associated with the same serial number acquired in S82 among backup information stored in the memory 32 in one of steps S86, S99, or S48 (described later) during a previously executed re-registration process. In S85 the program 37 modifies the print settings stored in the print queue generated for the printer 11 having the same serial number as the serial number associated with the identified backup information by overwriting the print settings in the print queue with the print settings in the backup information. In other words, in S85 the program 37 modifies the print settings stored in the print queue generated for the printer 11 having the serial number acquired in S82 by overwriting the print settings in the print queue with the print settings in the backup information. The process of S85 is an example of the (b) registering of the present disclosure.

Here, the circumstances for executing the process in S85 will be described in greater detail. If the printer 11 (first printer 11) that is connected to the USB port having the port ID "USB03" in the state illustrated in FIG. 3A is switched to the USB port having the port ID "USB05" and a different printer 11 (second printer 11) is connected to the USB port having the port ID "USB03", a second print queue (4) having the print queue name "ABC-A01 (copy)" is recorded in the registry. In this case, the first print queue (2) corresponds to the second printer 11 while the second print queue (4) corresponds to the first printer 11. Accordingly, the print settings stored in the second print queue (4). i.e., the second print settings (4) are modified to the first print settings (2) backed up as the print settings for the first print queue (2).

After completing the process in S84 or S85, in S86 the program 37 stores the serial number acquired in S82 and queue information stored in the print queue in the memory 32 as backup information, and subsequently ends the process for an enabled function. Note that the serial number is the number that the program 37 has acquired from the printer 11 through the corresponding port ID. Further, if the user were to modify the original print settings, the backed up print settings may be overwritten with the modified print settings. In S99 and S48 described later, backed up print settings may similarly be overwritten with modified print settings. The process of S86 is an example of the (d) storing of the present disclosure.

On the other hand, if the program 37 determines in S81 that an online print queue exists (S81: YES), in S87 the program 37 determines whether print settings are specified in the user-specified settings that were stored in the memory 32 in S15 of the settings reception process (see FIG. 6).

If the program 37 determines that print settings are not specified in the user-specified settings (S87: NO), in S88 the program 37 displays a first confirmation screen on the display 22. For example, the program 37 generates screen data representing the first confirmation screen, as with the second settings screen described earlier, and inputs this screen data into the display 22 to display the first confirmation screen on the display 22. The process of S88 is an example of the (n) displaying of the present disclosure. The first confirmation screen is an example of the input screen of the present disclosure.

Figure 5A:
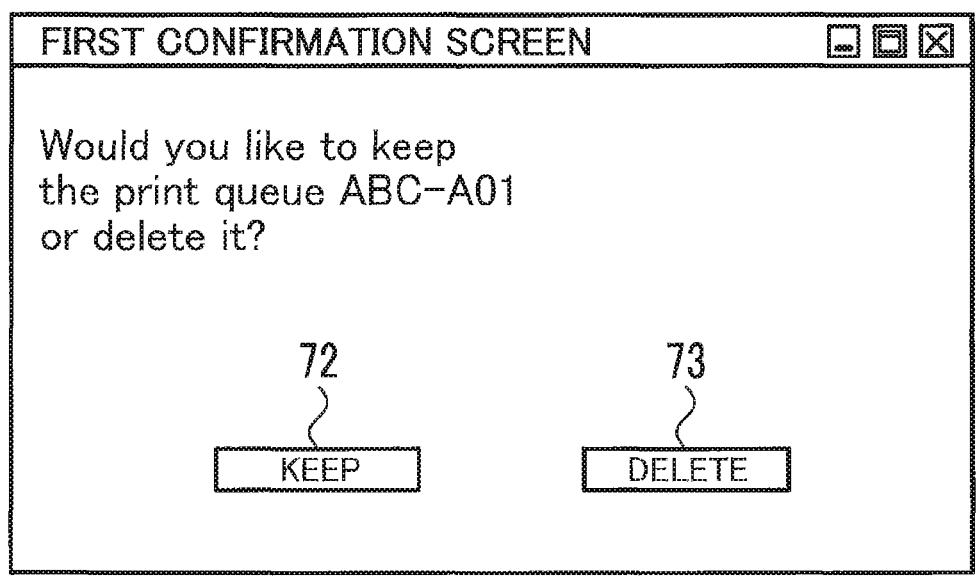
FIG. 5A is a schematic diagram illustrating a first confirmation screen displayed on the display of the information-processing device according to the embodiment.

FIG. 5A illustrates an example of the first confirmation screen. The first confirmation screen has the text "Would you like to keep the print queue ABC-A01 or delete it?", a Keep icon 72, and a Delete icon 73. Here, "ABC-A01" is the print queue name for the offline print queue.

Figure 8A:
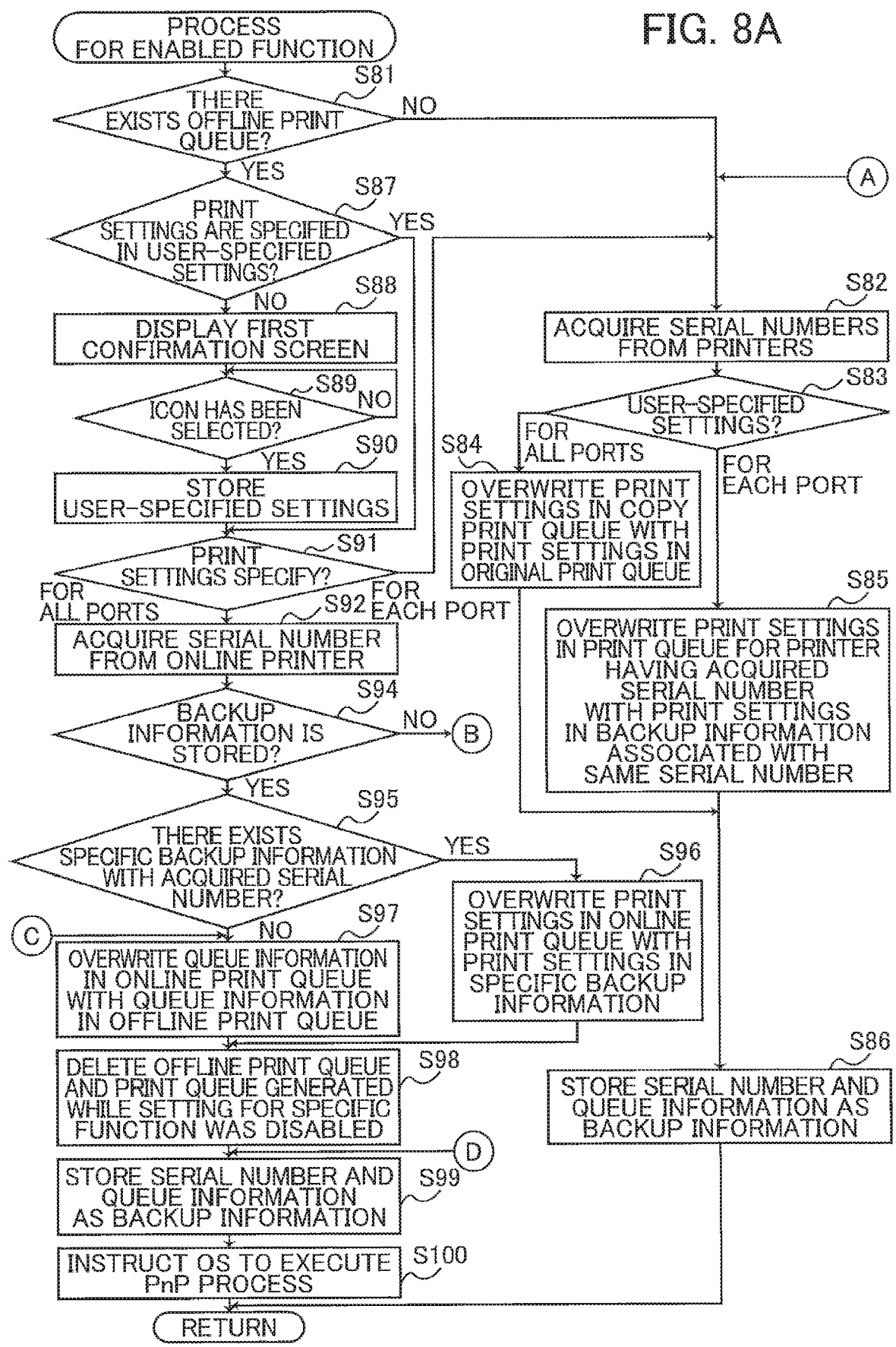
FIG. 8A is a flowchart illustrating steps in part of a process for an enabled function executed by the program installed on the information-processing device.

As illustrated in FIG. 8A, the program 37 continues to display the first confirmation screen on the display 22 while neither the Keep icon 72 nor the Delete icon 73 has been selected in the first confirmation screen (S89: NO). When the program 37 determines that one of the Keep icon 72 and Delete icon 73 has been selected (S89: YES), in S90 the program 37 stores the user-specified settings in the memory 32. Specifically, the program 37 stores the user-specified setting "FOR EACH PORT" in the memory 32 when the Keep icon 72 was selected, and stores the user-specified setting "FOR ALL PORTS" in the memory 32 when the Delete icon 73 was selected. In other words, if the user did not select one of the radio button 66 and radio button 67 in the first settings screen (see FIG. 4A), the first confirmation screen serves to receive a user-specified setting similar to the selection of the radio button 66 or radio button 67.

After completing the process in S90 or when the program 37 determines in S87 that print settings have been specified (S87: YES), in S91 the program 37 determines whether the print settings specify "FOR ALL PORTS" or "FOR EACH PORT". If the program 37 determines that the print settings specify "FOR EACH PORT" (S91: FOR EACH PORT), the program 37 executes the process in S82, S83, S85, and S86 described above, and subsequently ends the process for an enabled function.

However, if the program 37 determines that the print settings indicate "FOR ALL PORTS" (S91: FOR ALL PORTS), in S92 the program 37 acquires a serial number from the printer 11 associated with each online print queue. For example, the program 37 communicates with the printer 11 via the USB port having a port ID stored in the online print queue and acquires a serial number returned from the printer 11. The program 37 may acquire the serial number from the printer 11 through the OS 36 or may acquire the serial number through direct communication with the printer 11.

In S94 the program 37 determines whether backup information is stored in the memory 32. Backup information is not stored in the memory 32 when the program 37 is first started up, for example. However, backup information is stored in the memory 32 when the program 37 is started for the second and subsequent times. The process of S94 is an example of the (h) determining of the present disclosure.

If the program 37 determines that backup information is stored in the memory 32 (S94: YES), in S95 the program 37 determines whether the backup information stored in the memory 32 includes backup information having a serial number that matches the serial number of the online printer 11 acquired in S92. For example, when the second print queue (4) was generated under the conditions illustrated in FIG. 3B, queue information for the first print queue (2) is stored in the memory 32 as backup information in association with the serial number of the printer 11. In this case, the program 37 determines in S95 that there is backup information stored in the memory 32 with a serial number matching the serial number "0123456" of the online printer 11.

As illustrated in FIG. 8A, when the program 37 determines that backup information having the same serial number as the online printer 11 (i.e., specific backup information) is stored in the memory 32 (S95: YES), in S96 the program 37 overwrites the print settings stored in the online print queue with the print settings in the specific backup information. The program 37 also overwrites the print queue name stored in the online print queue with the print queue name in the specific backup information. In the example of FIG. 3B, the program 37 overwrites the second print settings (4), which are the default print settings stored in the second print queue (4), with the first print settings (2) in the backup information. The program 37 also overwrites the name "ABC-A01 (copy)" in the second print queue (4) with the name "ABC-A01" in the first print queue (2). In other words, the print queue name for the second print queue (4) is changed to "ABC-A01". The process of S96 is an example of the (b) registering of the present disclosure.

Next, the reason that print settings stored in a print queue with a print queue name containing the text "copy" are modified using backed up print settings rather than print settings stored in an offline print queue when the print queue is an online print queue will be described in detail. Some print queues generated when the specific function has been enabled do not include a serial number. In addition, the program 37 cannot communicate with a printer 11 associated with an offline print queue because the printer 11 is offline. In other words, the program 37 cannot identify the printer 11 for which the offline print queue was generated. Therefore, when a print queue is generated, i.e., when communication with the printer 11 is possible, the program 37 acquires a serial number from the printer 11 and stores the serial number in the memory 32 in association with queue information including the print settings as backup information. Thereafter, the program 37 uses this backup information to modify print settings stored in a print queue that has been newly generated and recorded in the registry, thereby storing suitable print settings in the newly generated print queue.

After completing the process in S96 of FIG. 8A, in S98 the program 37 deletes the offline print queue or the print queue that was newly generated and recorded in the registry while the specific function was not set up or while the setting for the specific function was disabled. For example, the program 37 treats a print queue that does not store a serial number as a print queue that was generated and recorded in the registry while the specific function was not set up or while the setting for the specific function was disabled. In other words, the program 37 deletes a print queue that includes a serial number. Using the example illustrated in FIG. 2D, the first print queue (1) is deleted from the registry since the first print queue (1) was generated and recorded in the registry when the setting for the specific function was disabled or when the specific function was not set up. In the example illustrated in FIG. 3B, the first print queue (2) is deleted from the memory 32 since the first print queue (2) is an offline print queue. The process of S98 is an example of the (l) deleting of the present disclosure. Here, the program 37 may delete the print queue from the registry directly or may input a command into the OS 36 to instruct the OS 36 to delete the print queue.

In S99 the program 37 stores the serial number of the online printer 11 acquired in S92 in association with the queue information stored in the print queue that was newly generated and recorded in the registry. The program 37 stores this information in the memory 32 as backup information in preparation for the next time the program 37 is started up. The process of S99 is an example of the (d) storing of the present disclosure.

After storing the backup information in the memory 32, in S100 the program 37 instructs the OS 36 to execute the PnP process, and subsequently ends the process for an enabled function. Note that if a new print queue including the text "copy" in the print queue name is not recorded in the registry, a new print queue will not be generated even during the PnP process of S100 except the case in which a printer 11 is newly connected to the information-processing device 10 while the re-registration process is executed.

On the other hand, if the program 37 determines in S95 that backup information containing a serial number matching the serial number of the online printer 11 is not stored in the memory 32 (S95: NO), in S97 the program 37 overwrites the queue information in the online print queue with queue information stored in the offline print queue. Using the example illustrated in FIG. 3B, the print queue name and the second print settings (4) stored in the second print queue (4) are overwritten with the print queue name and first print settings (2) stored in the first print queue (2). After completing the process in S97, the program 37 executes the process in steps S98, S99, and S100 described above, and subsequently ends the process for an enabled function.

Further, if the program 37 determines in S94 that backup information is not stored in the memory 32 (S94: NO), in S61 of FIG. 8B the program 37 displays a second confirmation screen on the display 22. The program 37 displays the second confirmation screen on the display 22 in the same manner as the second settings screen, for example.

Figure 5B:
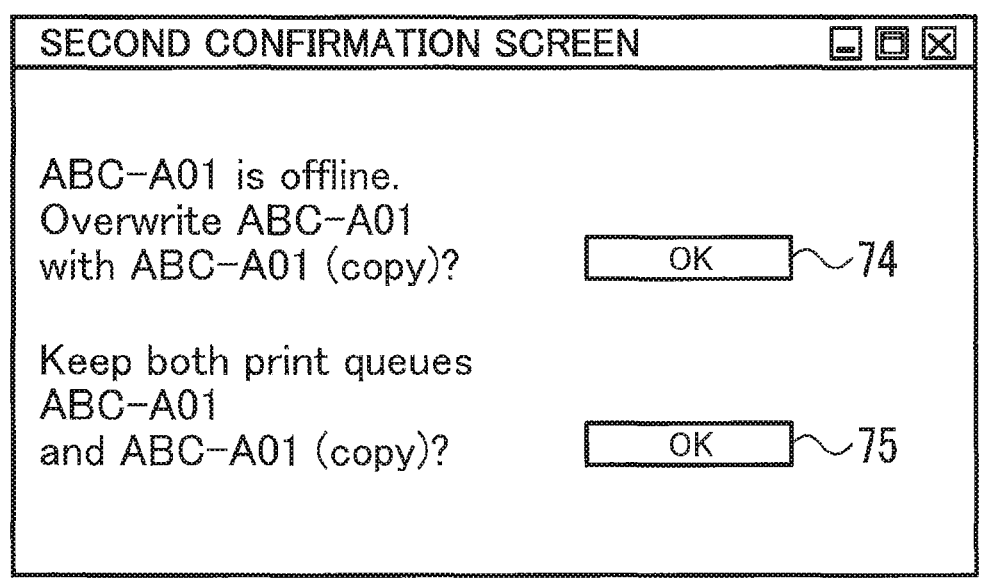
FIG. 5B is a schematic diagram illustrating a second confirmation screen displayed on the display of the information-processing device according to the embodiment.

The second confirmation screen receives a command from the user indicating whether to delete or keep the offline print queue since no backup information is stored in the memory 32. As illustrated in FIG. 5B, the second confirmation screen has the text "ABC-A01 is offline. Overwrite ABC-A01 with ABC-A01 (copy)?", a first OK icon 74 arranged to the right of this text, the text "Keep both print queues ABC-A01 and ABC-A01 (copy)?", and a second OK icon 75 arranged to the right of this text.

Figure 8B:
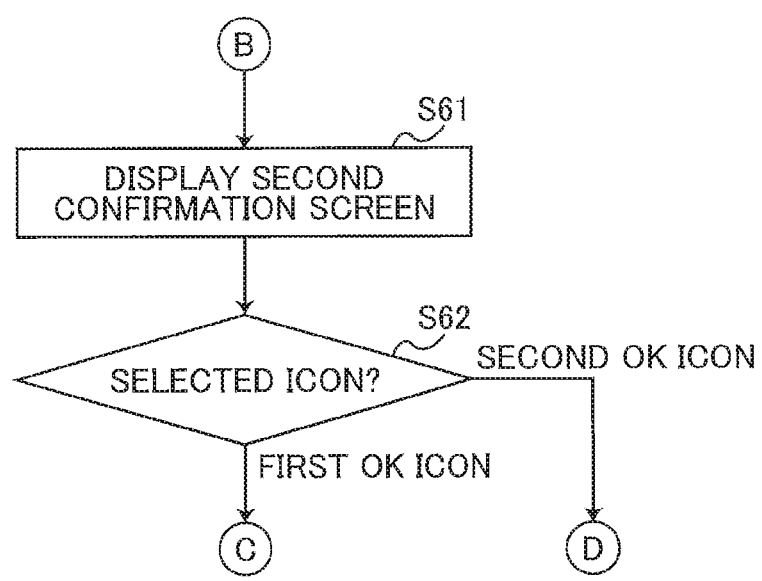
FIG. 8B is a flowchart illustrating steps in remaining part of the process for the enabled function executed by the program installed on the information-processing device.

In S62 of FIG. 8B, the program 37 determines whether the icon selected in the second confirmation screen is the first OK icon 74 or the second OK icon 75. If the program 37 determines that the selected icon is the first OK icon 74 (S62: FIRST OK ICON), the program 37 executes the process beginning from S97 in FIG. 8A. In other words, the program 37 overwrites the print queue name and print settings stored in the online print queue with the print queue name and print settings stored in the offline print queue. The process of S62 to receive a user selection for one of the first OK icon 74 and second OK icon 75 is an example of the (i) receiving of the present disclosure. A user selection for the first OK icon 74 is an example of the user instruction in the (j) deleting of the present disclosure.

If the program 37 determines in S62 of FIG. 8B that the selected icon is the second OK icon 75 (S62: SECOND OK ICON), the program 37 executes the process beginning from S99 in FIG. 8A, and subsequently ends the process for an enabled function. In other words, the original print queue is not deleted but is retained in the registry.

Figure 7B:
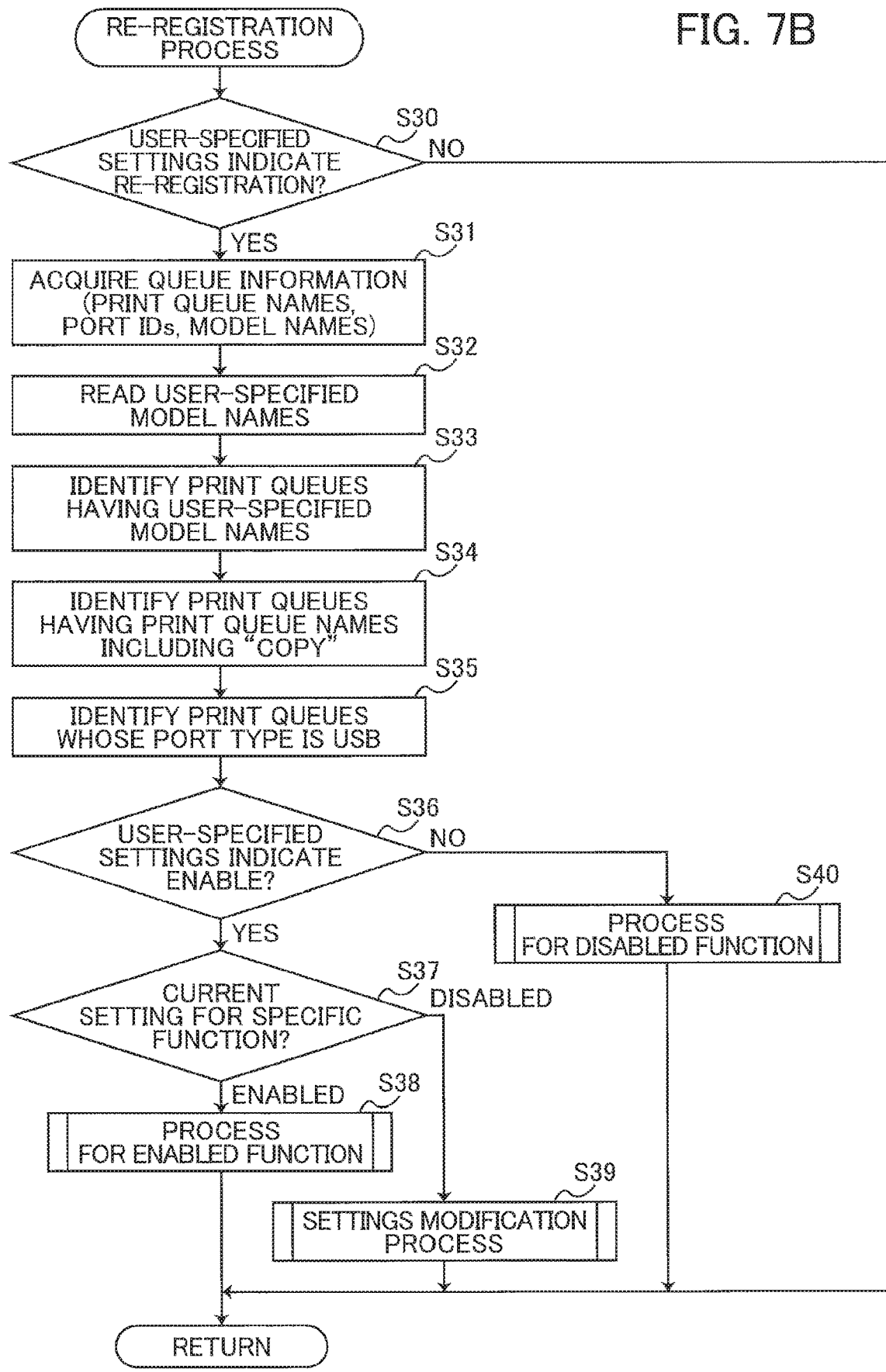
FIG. 7B is a flowchart illustrating steps in a re-registration process executed by the program installed on the information-processing device.
Figure 9:
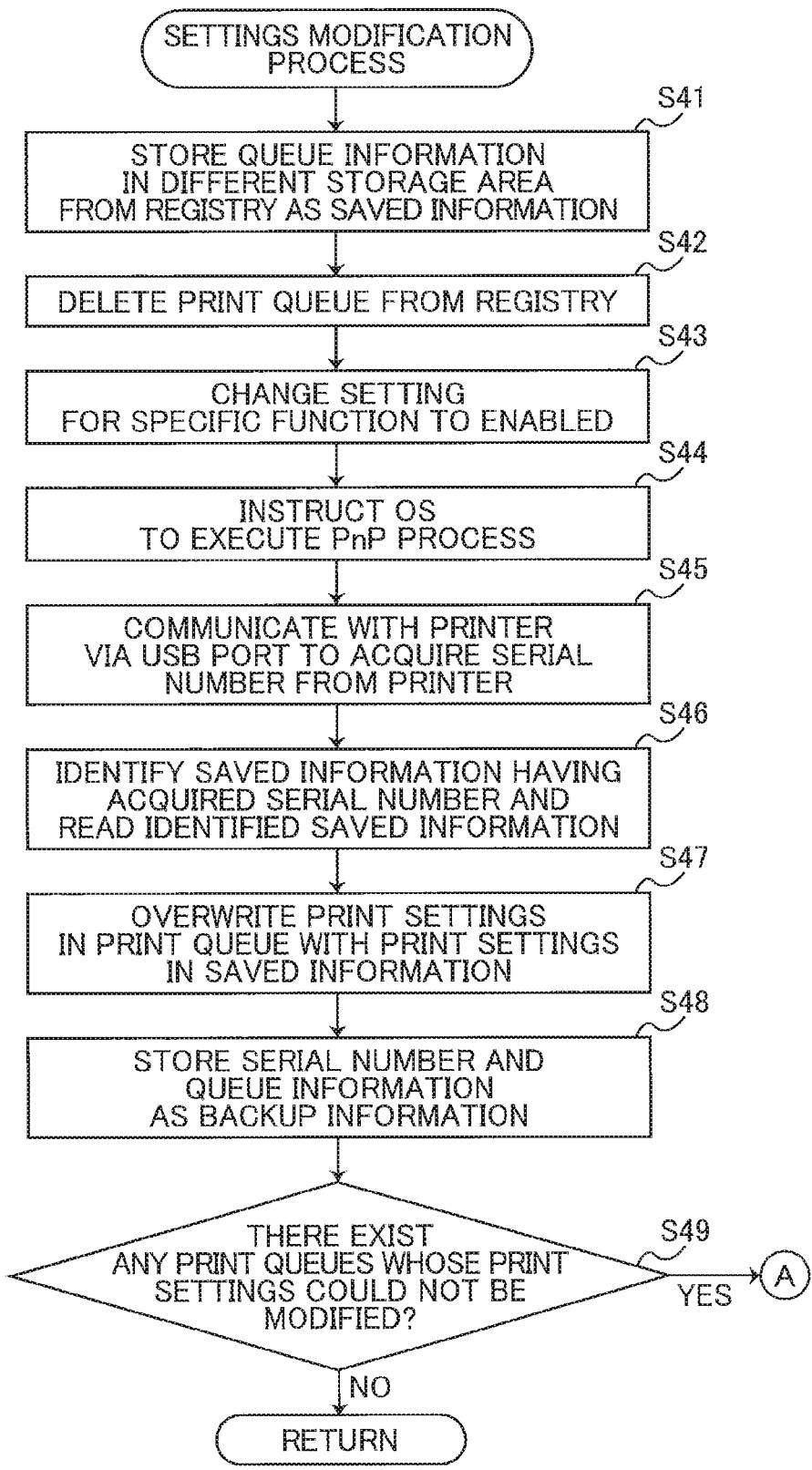
FIG. 9 is a flowchart illustrating steps in a settings modification process executed by the program installed on the information-processing device.

After completing the process for an enabled function in S38 of FIG. 7B, the program 37 ends the re-registration process. However, if the program 37 determines in S37 that the setting for the specific function is currently disabled (S37: DISABLED), in S39 the program 37 executes a settings modification process. In other words, if the user inputted an instruction into the OS 36 via the user interface 23 to disable the specific function, the program 37 executes the settings modification process when a copy print queue is recorded in the registry, regardless of whether the radio button 63 was selected in the first settings screen (see FIG. 4A). The settings modification process is performed to enable the specific function and to record a print queue generated when the setting for the specific function is enabled in the registry. The settings modification process will be described next in detail with reference to FIG. 9.

In S41 the program 37 stores the queue information from the print queue recorded in the registry in a different storage area of the memory 32 from the registry. The queue information stored in this different area of the memory 32 will be called "saved information." Since the print queue recorded in the registry was generated when the specific function was disabled, the print queue holds a serial number. Accordingly, the saved information also has a serial number.

In S42 the program 37 deletes the print queue recorded in the registry from the registry. Note that the print queue the program 37 deletes from the registry has a print queue name containing the model name selected by the user in the second settings screen (see FIG. 4B). The program 37 may delete the print queue from the registry directly or may input a command into the OS 36 instructing the OS 36 to delete the print queue.

In S43 the program 37 changes the setting for the specific function from disabled to enabled, and in S44 instructs the OS 36 to execute the PnP process. By executing the PnP process, the OS 36 generates a print queue for each online printer 11 and records the print queue generated for each online printer 11 in the registry. Note that each print queue recorded in the registry when executing the process of S44 may not hold the serial number of the printer 11 since the print queue is generated when the specific function is enabled. Therefore, in S45 the program 37 communicates with the printer 11 via the USB port specified by the port ID stored in the print queue that was newly recorded in the registry to acquire a serial number from the printer 11.

In S46 the program 37 identifies the saved information having a serial number matching the acquired serial number and reads the identified saved information from the memory 32. In S47 the program 37 overwrites the print settings stored in the print queue with the print settings in the saved information that was read in S46. If a plurality of print queues is recorded in the registry when executing the process in S44, saved information matching the serial number is identified and read for each print queue, and the print settings stored in each print queue are overwritten by the print settings in the corresponding saved information.

In S48 the program 37 stores the serial number acquired in S45 in the memory 32 in association with queue information including print settings in the saved information read in S46 as backup information. The backup information stored in the memory 32 in S48 is used when the re-registration process is next executed. The process of S48 is an example of the (d) storing of the present disclosure.

In S49 the program 37 determines whether there are any print queues whose print settings could not be modified. If the program 37 determines that there are no print queues whose print settings could not be modified (S49: NO), the program 37 ends the settings modification process. If the program 37 determines that there is a print queue whose print settings could not be modified (S49: YES), the program 37 executes the process beginning from S82 described in the process for an enabled function of FIG. 8, and subsequently ends the settings modification process.

As illustrated in FIG. 7B, after executing the settings modification process in S39, the program 37 ends the re-registration process. However, if the program 37 determines in S36 that the user-specified settings received in the settings reception process do not include the selection to set up and enable the specific function (S36: NO), in S40 the program 37 executes a process for a disabled function. That is, the process for a disabled function is executed when the user-specified settings received in the settings reception process include a selection to disable the specific function or not to set up the specific function.

Figure 10:
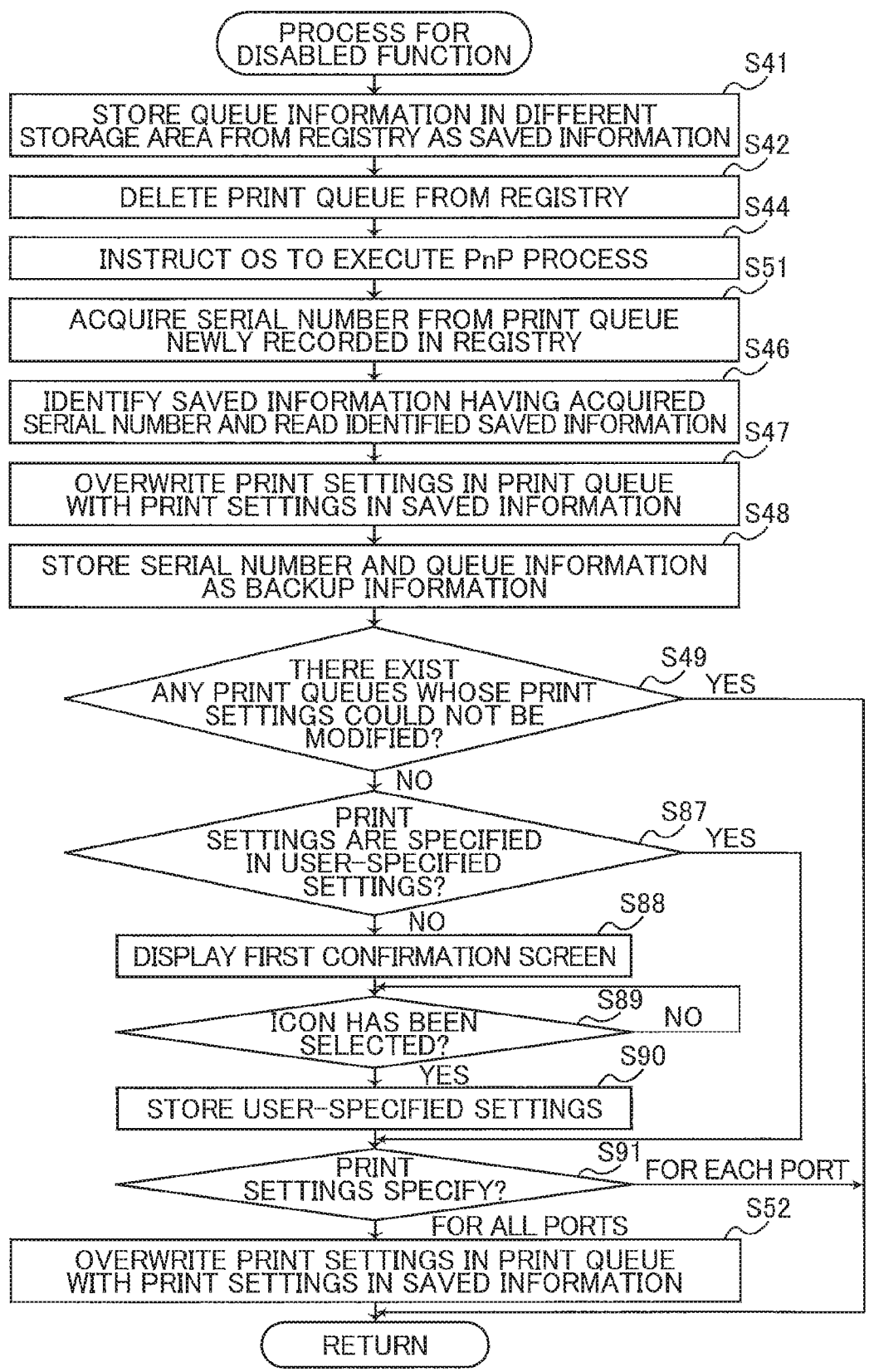
FIG. 10 is a flowchart illustrating steps in a process for a disabled function executed by the program installed on the information-processing device.

The process for a disabled function will be described next in greater detail with reference to FIG. 10. For example, the process for a disabled function is executed when the second print queue (1) illustrated in FIG. 2B or the second print queue (2) illustrated in FIG. 2C is recorded in the registry. Note that some steps in the process for a disabled function are identical to those described in the process for an enabled function of FIGS. 8A and 8B and the settings modification process of FIG. 9. Therefore, identical steps in FIG. 10 are designated with the same step numbers, and a description of these steps will be simplified.

In S41 at the beginning of the process for a disabled function, the program 37 stores queue information from the print queue recorded in the registry in the memory 32 as saved information. Since the print queue recorded in the registry was generated when the specific function was not set up or when the setting for the specific function was disabled, the queue information in the print queue has a serial number. That is, the saved information has a serial number.

In S42 the program 37 deletes the print queue from the registry. In S44 the program 37 instructs the OS 36 to execute the PnP process. When instructed to execute the PnP process, the OS 36 generates one or more print queues and records the print queues in the registry. Since each print queue newly recorded in the registry was generated when the specific function was not set up or when the setting for the specific function was disabled, the print queue stores a serial number. In S51 the program 37 acquires the serial number from each print queue newly recorded in the registry. Since the print queue newly recorded in the registry is an online print queue, the program 37 may communicate with the printer 11 via the USB port specified by the port ID stored in the online print queue to acquire a serial number from the printer 11.

In S46 the program 37 identifies the saved information having a serial number that matches the acquired serial number and reads the saved information from the memory 32. In S47 the program 37 overwrites the default print settings stored in the print queue with the print settings in the saved information read in S46. In S48 the program 37 stores the serial number acquired in S51 and the saved information read in S46 in the memory 32 as backup information.

In S49 the program 37 determines whether there are any print queues whose print settings could not be modified. More specifically, in S49 the program 37 determines whether there exists saved information having a serial number matching the serial number acquired in S45. If the program 37 determines that there are no print queues whose print settings could not be modified, i.e., there is no saved information with a matching serial number (S49: NO), the program 37 ends the process for a disabled function.

If the program 37 determines that there is a print queue whose print settings could not be modified, i.e., there exits saved information having a serial number matching the serial number acquired in S45 (S49: YES), the program 37 executes the process in S87 through S90 described in the process for an enabled function of FIG. 8. In S91 the program 37 determines whether the print settings in the user-specified settings indicate "FOR ALL PORTS" or "FOR EACH PORT". If the program 37 determines that the print settings specify "For each port" (S91: FOR EACH PORT), the program 37 ends the process for a disabled function. Hence, a print queue that does not have a serial number matching a serial number in the saved information and whose default print settings were not modified by the print settings in saved information is kept in the registry without modifying the default print settings.

If the program 37 determines that the print settings in the user-specified settings indicate "FOR ALL PORTS" (S91: FOR ALL PORTS), in S52 the program 37 overwrites the default print settings stored in the print queue with the print settings in the saved information, and subsequently ends the process for a disabled function.

<Effects of the Embodiment>

When a copy print queue has been recorded in the registry, the program 37 modifies the default print settings in the copy print queue by overwriting these default print settings with the print settings in backup information or saved information. Hence, when the user selects an icon with the print queue name of a print queue newly recorded in the registry from the selection screen for selecting a printer 11 to use for printing, the program 37 transmits print data to the printer 11 that was generated according to user-customized print settings rather than default print settings. Accordingly, the program 37 can control the printer 11 to execute a print with user-customized print settings, even when the OS 36 has newly recorded a print queue in the registry.

Further, the program 37 executes the process for an enabled function (see FIGS. 8A and 8B) when the second print queue (3) generated under the conditions illustrated in FIG. 2D has been recorded in the registry. In this case, the program 37 can overwrite the default print settings stored in the second print queue (3) with print settings in backup information, i.e., the first print settings (1) stored in the first print queue (1).

The program 37 also executes the process for an enabled function (see FIG. 8) when the second print queue (4) generated under the conditions illustrated in FIG. 3B has been recorded in the registry. In this case, the program 37 can overwrite default print settings stored in the second print queue (4) with the print settings in backup information, i.e., the first print settings (2) stored in the first print queue (2).

Further, by enabling the specific function, the program 37 can prevent the OS 36 from recording a new print queue in the registry when a printer 11 connected to a USB port is replaced with another printer 11 of the same model. Hence, the program 37 can prevent unnecessary print queues from being recorded in the registry.

When a copy print queue is newly recorded in the registry through the PnP process after the setting for the specific function was enabled, the program 37 detects that the copy print queue has been recorded in the registry and executes the process for an enabled function (S38). In the process for an enabled function, the program 37 modifies the default print settings stored in the copy print queue recorded in the registry to print settings in backup information. Therefore, by enabling the specific function, the program 37 can modify default print settings in a generated print queue to user-customized print settings.

The program 37 also communicates with a printer 11 indicated by a copy print queue to acquire the serial number for the printer 11, and identifies backup information having a serial number that matches the acquired serial number. The program 37 overwrites default print settings stored in the copy print queue with the print settings in the identified backup information. Hence, by storing backup information in the memory 32, the program 37 can modify default print settings stored in a copy print queue to user-customized print settings.

When a copy print queue is recorded in the registry, the program 37 determines whether an offline print queue exists (S81) and, if an offline print queue exists, deletes the offline print queue from the registry (S98). Hence, the program 37 can reduce the number of unnecessary print queues to facilitate the user in selecting a desired printer 11 in the selection screen.

The program 37 determines whether to delete or keep an offline print queue in the registry (S91) according to user-specified settings received in the settings reception process. In other words, the program 37 can prompt the user to specify whether to delete or keep an offline print queue in the registry.

If the user did not specify a print setting in the settings reception process (S87: NO), the program 37 can display the first confirmation screen on the display 22 and prompt the user to specify the print setting (S88 through S90).

When the setting for the specific function is enabled, the program 37 communicates with the printer 11 to acquire a serial number from the printer 11 (S92). The program 37 stores the acquired serial number in the memory 32 in association with queue information as backup information (S99, S86). Accordingly, the program 37 can modify default print settings stored in a copy print queue by overwriting the default print settings with user-customized print settings, even when the setting for the specific function was enabled.

If the program 37 determines that backup information is not stored in the memory 32 (S94: NO), the program 37 displays the second confirmation screen on the display 22 (S61) to receive a user instruction. Hence, the program 37 can receive a user instruction to execute an appropriate process, even when backup information is not stored in the memory 32, such as when the program 37 is started for the first time.

The program 37 acquires the number of print queues recorded in the registry (S25) and, if the acquired number is greater than the previous number (i.e., the previously acquired number of print queues; S26: YES), the program 37 reads the print queue names from the memory 32 (S31). Hence, the program 37 can detect when a print queue subject to the re-registration process has been recorded in the registry, without always reading the print queue names from the memory 32. As a result, the program 37 can reduce processing load on the CPU 31.

The program 37 deletes the offline print queue (S98) and changes the print queue name of the copy print queue that is an online print queue to the print queue name in the backup information. In the example of FIG. 3B, the first print queue (2) is deleted, and the print queue name "ABC-A01 (copy)" for the second print queue (4) is changed to "ABC-A01". In other words, an online print queue name is modified to a print queue name without "copy". Therefore, the program 37 enables the user to select an icon in the selection screen without any confusion.

Variations of the Embodiment

In the example described above in the present embodiment, the first confirmation screen is displayed on the display 22 and the user is prompted to specify a print setting (S88 through S90 of FIG. 8A) if the user did not specify the print setting in the settings reception process of FIG. 6 (S87: NO). However, the first confirmation screen may be displayed on the display 22 regardless of whether the user has specified the print setting. In other words, the process in S88 through S90 may be performed in all cases. By always executing the process in S88 through S90, the program 37 can receive a user instruction indicating whether to delete the offline print queue from the registry each time a copy print queue is recorded in the registry. In this variation, the first settings screen (see FIG. 4A) need not include the radio buttons 66 and 67 and the text "DESIGNATE PRINT SETTINGS."

In the example described above in the present embodiment, the program 37 periodically acquires the number of print queues recorded in the registry and, when the acquired number exceeds the previously acquired number (S26: YES), the program 37 acquires the print queue names (S31) and determines whether any of the acquired print queue names include the text "copy". However, in place of the process described in S24 through S27, the program 37 may execute a process to periodically acquire print queue names, port IDs, and model names. This variation still enables the program 37 to detect when a print queue subject to the re-registration process has been recorded in the registry.

In the example described above in the present embodiment, the second module 39 is started up in a case where a print queue having a print queue name that contains the text "copy" has been recorded in the registry. However, the second module 39 may be started up directly in response to an instruction from the user. For example, if the user wishes to organize print queues that have been recorded in the registry, the user may start up the second module 39 to execute the re-registration process. By executing the first module 38 and second module 39, the program 37 can execute the re-registration process when a print queue having a print queue name that contains the text "copy" has been recorded in the registry, and can also execute the re-registration process in response to a user instruction.

In the example described above in the present embodiment, the program 37 deletes an offline print queues and overwrites the print queue name and print settings stored in an online print queue with the print queue name and print settings in the backup information. However, the program 37 may generate anew print queue that includes the port ID and model name stored in the online print queue, a print queue name generated from the model name, and the print settings in the backup information, and may record the generated new print queue in the registry. In this case, the program 37 deletes the online print queue and offline print queue that the OS 36 recorded in the registry.

In the example described above in the present embodiment, the OS 36 acquires a model name from the printer 11, generates a print queue having a print queue name that includes the acquired model name, and records the print queue in the registry. However, if a user-setting name, i.e., a name that the user inputs into the printer 11, has been stored in the memory 52 of the printer 11, the OS 36 may acquire the user-setting name, generate a print queue having a print queue name that includes the acquired user-setting name, and record the print queue in the registry. The user-setting name is an example of the printer name of the present disclosure.

What is claimed is:

1. A non-transitory computer readable storage medium storing a set of program instructions installed on and executed by a computer included in an information-processing device on which an operating system is installed, the operating system being configured to cause the computer to perform: executing a plug-and-play process for a printer connected to a physical port having a port ID to acquire a printer name from the printer, the physical port including at least a first port having a first port ID; generating a print queue name based on the acquired printer name; and registering print queue information on a memory, the print queue information including the print queue name, a print setting, and the port ID mutually associated with one another, the information-processing device being configured to install an application program thereon, the application program being configured to cause the computer to perform: displaying a selection screen on a display, the selection screen including at least one print queue name registered on the memory; receiving a user selection for one of the at least one print queue name through the selection screen; and outputting to the operating system a print command specifying the print queue information corresponding to the selected print queue name, the operating system being configured to cause, in response to the print command, the computer to further perform outputting a print execution command to the printer connected to the physical port identified by the port ID included in the specified print queue information specified by the print command, the print execution command instructing the printer to execute a print operation using the print setting included in the specified print queue information, the set of program instructions, when executed by the computer, causing the computer to perform:

(a) detecting, after first print queue information is registered on the memory, second print queue information being registered on the memory, the first print queue information including a first print queue name, a first print setting, and the first port ID mutually associated with one another, the first print queue name being based on a first printer name acquired via a first plug-and-play process for a first printer connected to the first port, the second print queue information including a second print queue name, a second print setting, and a second port ID mutually associated with one another, the second print queue name being based on the first printer name and different from the first print queue name; and (b) registering, in response to detecting the second print queue information being registered on the memory, third print queue information on the memory, the third print queue information including the first printer name, the first print setting, and the second port ID mutually associated with one another.

2. The non-transitory computer readable storage medium according to claim 1, wherein the physical port further includes a second port different from the first port and having the second port ID, and wherein the second print queue information is registered by executing a second plug-and-play process for the first printer connected to the second port.

3. The non-transitory computer readable storage medium according to claim 1, wherein the second print queue information is registered by executing a second plug-and-play process for the first printer connected to the first port after the first print queue information is registered by executing the first plug-and-play process for the first printer connected to the first port, and the second port ID included in the second print queue information is the same as the first port ID included in the first print queue information.

4. The non-transitory computer readable storage medium according to claim 1, wherein the operating system has a specific function that allows not to register the second print queue information on the memory when a second plug-and-play process is executed for a second printer connected to the first port after the first print queue information is registered by executing the first plug-and-play process for the first printer connected to the first port, the second printer being different from the first printer but having the same name of the first printer, and wherein the set of program instructions, when executed by the computer, causes the computer to further perform:

(c) enabling the specific function in response to accepting a setting to enable the specific function.

5. The non-transitory computer readable storage medium according to claim 1, wherein the set of program instructions, when executed by the computer, causes the computer to further perform:

(d) storing first backup information including the first print queue name, the first print setting, the first port ID, and first printer identification information mutually associated with one another, the first print queue name, the first print setting, and the first port ID being included in the first print queue information registered on the memory, the first printer identification information identifying the first printer.

6. The non-transitory computer readable storage medium according to claim 5, wherein the set of program instructions, when executed by the computer, causes the computer to further perform:
- (e) determining whether the first print queue information registered on the memory includes the first printer identification information, and
- wherein the (d) storing acquires, in response to determining that the first print queue information does not include the first printer identification information, the first printer identification information from the first printer specified by the first print queue information and stores the first backup information generated by adding the acquired first printer identification information to the first print queue information.

7. The non-transitory computer readable storage medium according to claim 5, wherein the memory is configured to store therein backup information including a print queue name, a print setting, a port ID, and printer identification information mutually associated with one another,
- wherein the set of program instructions, when executed by the computer, causes the computer to further perform:
- (f) acquiring second printer identification information identifying the second printer connected to the second port, the second port being identified by the second port ID included in the second print queue information; and
- (g) identifying second backup information including the second printer identification information from the backup information stored in the memory, and
- wherein the (b) registering acquires a third print setting from the identified second backup information and registers the third print queue information generated by modifying the second print setting included in the second print queue information to the acquired third print setting.

8. The non-transitory computer readable storage medium according to claim 7, wherein the backup information stored in the memory includes the first backup information,
- wherein the (g) identifying identifies the first backup information as the second backup information in a case where the second printer identification information is the same as the first printer identification information, and
- wherein the (b) registering acquires the first print setting from the first print queue information included in the identified first backup information and registers the third print queue information generated by modifying the second print setting included in the second print queue information to the acquired first print setting.

9. The non-transitory computer readable storage medium according to claim 5, wherein the set of program instructions, when executed by the computer, causes the computer to further perform:
- (h) determining whether backup information including the first print queue information registered on the memory is stored in the memory;
- (i) receiving, in response to determining that the backup information is not stored in the memory, a user instruction as to whether to delete the first print queue information registered on the memory; and
- (j) deleting, in response to receiving the user instruction to delete the first print queue information, the first print queue information from the memory.

10. The non-transitory computer readable storage medium according to claim 1, wherein the set of program instructions, when executed by the computer, causes the computer to further perform:
- (k) determining, in response to detecting the second print queue information being registered in (a), whether communication with the first printer is possible; and
- (l) deleting, in response to determining that the communication with the first printer is impossible, the first print queue information from the memory.

11. The non-transitory computer readable storage medium according to claim 10, wherein the set of program instructions, when executed by the computer, causes the computer to further perform:
- (m) receiving input for a user-specified setting,
- wherein the (k) determining and the (l) deleting are skipped in response to receiving the input specifying a first type for the user-specified setting, and
- wherein the (k) determining and the (l) deleting are performed in response to receiving the input specifying a second type different from the first type for the user-specified setting.

12. The non-transitory computer readable storage medium according to claim 11, wherein the set of program instructions, when executed by the computer, causes the computer to further perform:
- (n) displaying, in response to detecting the second print queue information being registered in (a), an input screen for receiving the input for the user-specified setting on the display.

13. The non-transitory computer readable storage medium according to claim 12, wherein the set of program instructions, when executed by the computer, causes the computer to further perform:
- (o) determining, in a state where the first print queue information including the first port ID is registered on the memory, whether communication with the first printer connected to the first port is possible;
- wherein the (n) displaying displays, in response to determining that the communication with the first printer is impossible, the input screen for receiving the input for the user-specified setting specifying whether to delete the first print queue information from the memory.

14. The non-transitory computer readable storage medium according to claim 1, wherein the physical port includes a USB port conforming to a USB communication standard.

15. The non-transitory computer readable storage medium according to claim 1, wherein the (a) detecting comprises:
- (a1) repeatedly acquiring a number of print queue information registered on the memory, a currently acquired number being acquired subsequent to a previously acquired number;
- (a2) determining whether the currently acquired number is larger than the previously acquired number; and
- (a3) acquiring, in response to determining that the currently acquired number is larger than the previously acquired number, the print queue name and the print queue information from the memory.

16. The non-transitory computer readable storage medium according to claim 1, wherein the (a) detecting comprises:
- (a4) repeatedly acquiring print queue names registered in the memory;
- (a5) determining whether any of the print queue names includes a specific name; and (a6) detecting the second print queue information being registered on the memory in response to determining that any of the print queue names includes the specific name.

17. The non-transitory computer readable storage medium according to claim 1, wherein the set of program instructions includes a first module and a second module,
- wherein the first module, when executed by the computer, causes the computer to perform: displaying an input screen on the display; and receiving a setting through the input screen, and
- wherein the second module, when executed by the computer, causes the computer to perform the (b) registering.

\* \* \* \* \*